(12) United States Patent
Hsu et al.

(10) Patent No.: US 12,124,088 B2
(45) Date of Patent: Oct. 22, 2024

(54) EDGE COUPLERS AND METHODS OF MAKING THE SAME

(71) Applicant: Taiwan Semiconductor Manufacturing Co., Ltd., Hsinchu (TW)

(72) Inventors: Min-Hsiang Hsu, Hsinchu (TW); Chewn-Pu Jou, Hsinchu (TW); Chan-Hong Chern, Palo Alto, CA (US); Cheng-Tse Tang, Zhubei (TW); Yung-Jr Hung, Kaohsiung (TW); Lan-Chou Cho, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 18/232,319

(22) Filed: Aug. 9, 2023

(65) Prior Publication Data

US 2023/0400639 A1 Dec. 14, 2023

Related U.S. Application Data

(62) Division of application No. 17/461,534, filed on Aug. 30, 2021, now Pat. No. 11,796,739.

(51) Int. Cl.
*G02B 6/30* (2006.01)

(52) U.S. Cl.
CPC .................................. *G02B 6/305* (2013.01)

(58) Field of Classification Search
CPC ..................................................... G02B 6/305
See application file for complete search history.

(56) References Cited

U.S. PATENT DOCUMENTS

| 11,796,739 B2 * | 10/2023 | Hsu ................... G02B 6/12004 |
| 2019/0243064 A1 | 8/2019 | Menezo et al. |
| 2019/0369341 A1 | 12/2019 | Shaw et al. |
| 2020/0264391 A1 | 8/2020 | Tummidi |

* cited by examiner

*Primary Examiner* — Tina M Wong
(74) *Attorney, Agent, or Firm* — Duane Morris LLP

(57) ABSTRACT

Disclosed are edge couplers having a high coupling efficiency and low polarization dependent loss, and methods of making the edge couplers. In one embodiment, a semiconductor device for optical coupling is disclosed. The semiconductor device includes: a substrate; an optical waveguide over the substrate; and a plurality of layers over the optical waveguide. The plurality of layers includes a plurality of coupling pillars disposed at an edge of the semiconductor device. The plurality of coupling pillars form an edge coupler configured for optically coupling the optical waveguide to an optical fiber placed at the edge of the semiconductor device.

20 Claims, 33 Drawing Sheets

EDGE COUPLERS AND METHODS OF MAKING THE SAME

CROSS-REFERENCE TO RELATED APPLICATION

This application is a division of U.S. patent application Ser. No. 17/461,534, filed Aug. 30, 2021, which is incorporated by reference herein in its entirety.

BACKGROUND

Optical couplers are frequently used to enable communication between light sources and other components (e.g., photodetectors). For example, an edge coupler can be used to redirect light from an optical fiber into an optical waveguide in a chip. To achieve efficient optical coupling between fiber and waveguide, the mode sizes or mode field diameters (MFDs) of fiber and waveguide need to be matched. To match a large optical mode, e.g. 10 micrometers, in a fiber, methods have been used to modify the waveguide mode size, either by changing the waveguide geometry or by using different materials in the waveguide. However, the geometry modification and/or adding exotic materials would bring much complexity in the fabrication process. For example, an undercut of an edge coupler, although helping to match the mode sizes of the fiber and the waveguide, can cause an unstable mechanism and make the fabrication process unreliable. In addition, existing edge couplers cannot simultaneously achieve good coupling efficiency, low polarization dependent loss, and a compatibility with a complementary metal-oxide-semiconductor (CMOS) platform.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1A:
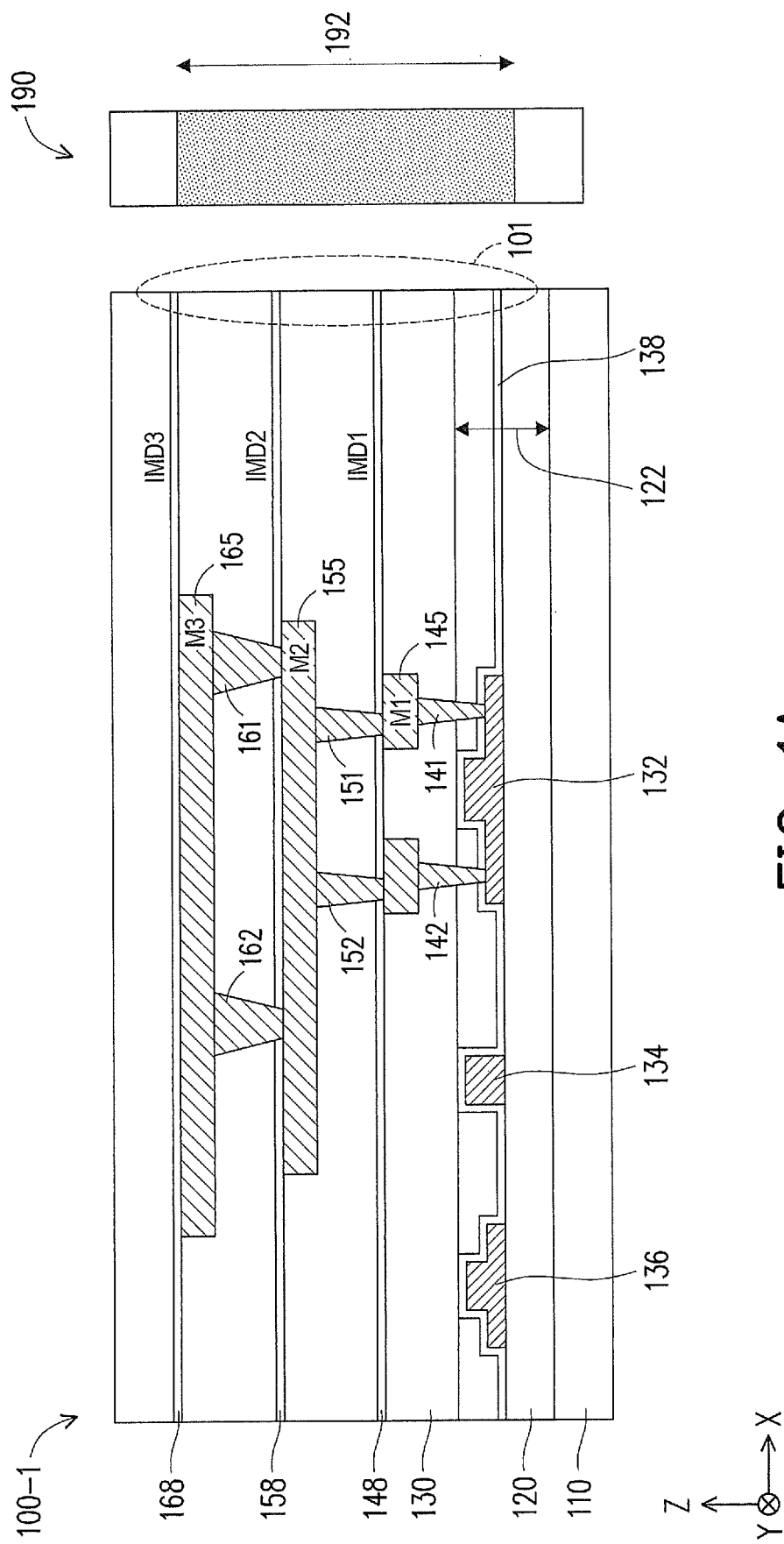
FIG. 1A illustrates a cross sectional view of an exemplary semiconductor device, in accordance with some embodiments of the present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

Optical applications may use different fiber types with different mode field diameters (MFDs), e.g. varying from 2 to 30 micrometers. It is not straightforward to build a light-coupling interface, e.g. an edge coupler, to transmit optical signals between a bulky optical fiber and a tiny optical waveguide. For example, to match a 10-micrometer optical mode of a fiber, the effective index in the waveguide needs to be about 1.6.

In one option, when a silicon waveguide is used, the waveguide's width or thickness is decreased dramatically to obtain a desirable effective index, because silicon's effective index is very large, about 3.5. For example, the silicon waveguide width needs to be less than 100 nanometers or its thickness needs to be less than 150 nanometers, to obtain the effective index of 1.6. In this option, a cost-expensive mask is needed with high resolution to obtain critical dimension (CD) below 100 micrometers. While the thickness of silicon on a silicon-on-insulator (SOI) wafer in photonics applications is usually larger than 150 micrometers, the SOI silicon needs to be thinned down to obtain an effective index of 1.6; but a thinning process to keep the CD below 100 micrometers will be very challenging. In addition, because the polarization dependent loss (PDL) is highly dependent on the waveguide symmetry, if the waveguide width is not equal to the waveguide height, the PDL will be large and degrade the waveguide performance.

In another option, a material with a smaller refraction index than silicon may be used in the waveguide to enlarge the mode size and obtain the effective index of 1.6. A complementary metal-oxide-semiconductor (CMOS) platform, especially for the mature technology nodes, is very stringent, and has difficulty to introduce new materials or new process module. As such, both options will increase complexity in the fabrication process, and face several challenges described above.

This disclosure presents various embodiments of an edge coupler, with a CMOS-compatible solution by engineering dielectric layers in a standard back end of line (BEOL) process, to achieve high coupling efficiency and low polarization dependent loss (PDL) at the same time. In some embodiments, a disclosed edge coupler is located at an edge of a photonic device, and over an optical waveguide of the photonic device. The photonic device may be formed using CMOS compatible materials following a CMOS compatible fabrication process. The edge coupler is configured for optically coupling the waveguide to an optical fiber placed at the edge of the device. The edge coupler may include a plurality of dielectric pillars arranged along a geometry shape to obtain a mode shape and/or size matching the mode shape and/or size of the fiber, to achieve high coupling efficiency. The geometry shape may be a circle, a half circle, a square, a rectangle, a triangle, or an oval. In some embodiments, at least some of the pillars may be located in different inter-metal dielectric (IMD) layers, to achieve low PDL without changing the thickness of the waveguide.

The disclosed mode matching solution relaxes the process tolerance in fabrication, and gives broad design flexibilities to modify the mode shape and size of the waveguide, with flexible material selection and geometry of waveguide. The disclosed edge coupler is applicable in any silicon photonics applications, including but not limited to: a transceiver in data center, a biosensor in medicine, a LiDAR in automobile, or a gyroscope in defense or space industries.

Figure 1B:
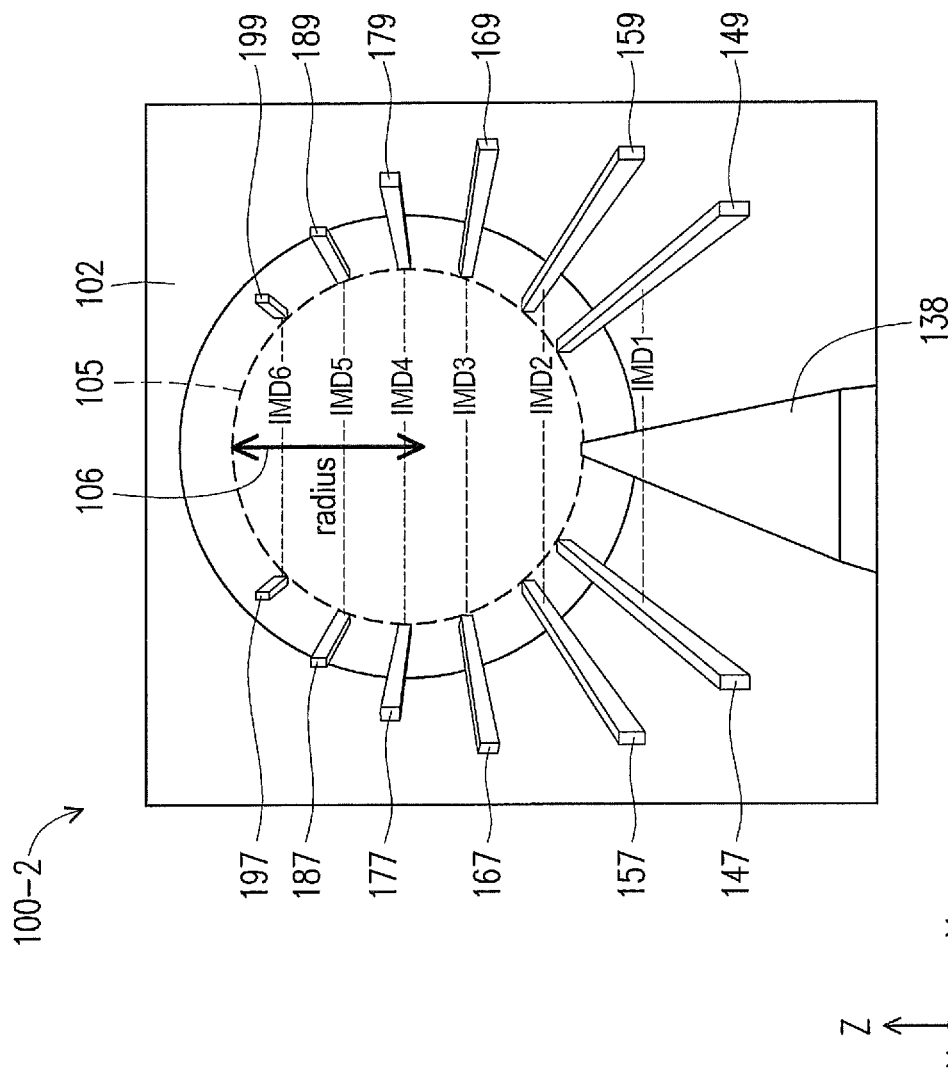
FIG. 1B illustrates a side view of an exemplary semiconductor device, in accordance with some embodiments of the present disclosure.

FIG. 1A illustrates a cross sectional view of an exemplary semiconductor device 100-1, in accordance with some embodiments of the present disclosure. FIG. 1B illustrates a side view of an exemplary semiconductor device 100-2, corresponding to the semiconductor device 100-1 in FIG. 1A, in accordance with some embodiments of the present disclosure. It is noted that the device 100-1 is merely an example, and is not intended to limit the present disclosure. Accordingly, it is understood that additional functional blocks may be provided in or coupled to the device 100-1 of FIG. 1, and that some other functional blocks may only be briefly described herein.

Referring to FIG. 1A, the device 100-1 includes: a substrate 110; an optical waveguide 132, 134, 136 over the substrate 110; and a plurality of layers 138, 148, 158, 168 over the optical waveguide 132, 134, 136. In some embodiments, the optical waveguide includes a plurality of coupling gratings 132, 134, 136 over the substrate 110. In some embodiments, at least two of the coupling gratings have different shapes from each other; and at least one of the coupling gratings comprises an active photonic device. For example, the optical waveguide may include raised shape gratings 132, 136, and/or a rectangular grating 134. In some embodiments, at least one of coupling gratings may be an active photonic device. In some embodiments, at least one of coupling gratings may be a slab waveguide or a strip waveguide. As shown in FIG. 1A, the coupling gratings 132, 134, 136 are formed in a dielectric layer 120 which is disposed on the substrate 110. In some embodiments, the substrate 110 includes silicon; and the dielectric layer 120 includes silicon oxide. The coupling gratings 132, 134, 136 are formed on a silicon-on-insulator (SOI) substrate including the substrate 110 and the dielectric layer 120.

As shown in FIG. 1A, the semiconductor device 100-1 further includes a cladding layer 130 over the optical waveguide 132, 134, 136 and the dielectric layer 120. In some embodiments, the cladding layer 130 comprises silicon oxide, and has a plurality of metal layers 145, 155, 165 formed within the cladding layer 130. The plurality of layers over the optical waveguide 132, 134, 136 comprises inter-metal dielectric (IMD) layers disposed between two adjacent metal layers of the plurality of metal layers 145, 155, 165. For example, an IMD1 layer 148 is disposed between the metal 1 (M1) layer 145 and the metal 2 (M2) layer 155; an IMD2 layer 158 is disposed between the M2 layer 155 and the metal 3 (M3) layer 165; and an IMD3 layer 168 is disposed between the M3 layer 165 and other metal layers (not shown) over the M3 layer 165. As shown in FIG. 1A, the M1 layer 145 is electrically coupled to the photonic device 132 by vias 141, 142; the M2 layer 155 is electrically coupled to the M1 layer 145 by vias 151, 152; and the M3 layer 165 is electrically coupled to the M2 layer 155 by vias 161, 162. In some embodiments, each of the metal layers 145, 155, 165 and the vias 141, 142, 151, 152, 161, 162 includes a metal material, while each of the IMD1 layers 148, 158, 168 includes a dielectric material, e.g. polycrystalline silicon, silicon nitride, or silicon oxide.

In some embodiments, the plurality of layers 138, 148, 158, 168 includes a plurality of coupling pillars disposed at an edge of the semiconductor device 100-1. As shown in FIG. 1B, the plurality of coupling pillars 138, 147, 149, 157, 159 . . . 197, 199 are arranged on different layers according to a pattern, e.g. a circular pattern as shown in FIG. 1B, or a pattern of a half circle, a square, a rectangle, a triangle, or an oval in other examples. For example, the coupling pillar 138 is arranged on the layer 138; the coupling pillars 147, 149 are arranged on the IMD1 layer; the coupling pillars 157, 159 are arranged on the IMD2 layer; the coupling pillars 167, 169 are arranged on the IMD3 layer; the coupling pillars 177, 179 are arranged on the IMD4 layer; the coupling pillars 187, 189 are arranged on the IMD5 layer; and the coupling pillars 197, 199 are arranged on the IMD6 layer. As shown in FIG. 1A and FIG. 1B, each of the plurality of coupling pillars extends along a lateral direction (the X direction) that is in parallel with a top surface of the substrate 110. In some embodiments, the semiconductor device 100-1 may be formed using CMOS compatible materials following a CMOS compatible fabrication process, which lowers the cost and simplifies the fabrication process. For example, while a CMOS fabrication process may use the IMD layers as etch stop layers for controlling an etching process, the coupling pillars in FIG. 1A and FIG. 1B may be formed as portions (at the edge of the semiconductor device 100-1 close to the fiber 190) of the etch stop layers without changing the main steps of the CMOS fabrication process. While there are 13 coupling pillars 138, 147, 149, 157, 159 . . . 197, 199 shown in FIG. 1B, the semiconductor device 100-1 may include any number of coupling pillars in other embodiments.

In some embodiments, as shown in FIG. 1A and FIG. 1B, at least one of the plurality of coupling pillars, e.g. the pillar 138 in FIG. 1A, has a taper structure whose width gradually increases along the X direction from a first end inside the semiconductor device 100-1 to a second end at the edge of the semiconductor device 100-1. As shown in FIG. 1A and FIG. 1B, at least one of the plurality of coupling pillars, e.g. the pillars 147, 149, 157, 159 . . . 197, 199 in FIG. 1B, has a non-taper structure whose width is kept constant along the Y direction from the first end inside the semiconductor device 100-1 to the second end at the edge of the semiconductor device 100-1. In some embodiments, a pillar in one of the IMD layers may have a taper structure, while the other pillars of the semiconductor device 100-1 have non-taper structures. 3.5

In some embodiments, each of the plurality of coupling pillars may have a cross-section whose shape is one of: a polygon, a circle, or an oval. In the example shown in FIG. 1B, each of the plurality of coupling pillars has a cross-section whose shape is a rectangle. The cross-section may be on a surface 102 perpendicular to the X direction.

As shown in FIG. 1B, the plurality of coupling pillars extend to the edge of the semiconductor device from a same surface 102 perpendicular to the X direction. Locations of the plurality of coupling pillars 138, 147, 149, 157, 159 . . . 197, 199 on the same surface 102 form a shape, which may be a circle, a half circle, a square, a rectangle, a triangle, or an oval. In the example shown in FIG. 1B, the shape is a circle 105 with a radius 106. In some embodiments, the radius is between 0.5 and 1.5 micrometers.

In some embodiments, the plurality of coupling pillars 138, 147, 149, 157, 159 . . . 197, 199 have a same length measured from the same surface 102 to the edge of the semiconductor device. In other embodiments, as shown in FIG. 1B, the plurality of coupling pillars 138, 147, 149, 157, 159 . . . 197, 199 have different lengths measured from the same surface 102 to the edge of the semiconductor device; and lengths of the plurality of coupling pillars 138, 147, 149, 157, 159 . . . 197, 199 gradually decrease as a distance between a respective coupling pillar and the substrate 110 increases. In some embodiments, each pillar has a length between 50 and 150 micrometers.

Referring back to FIG. 1A, the plurality of coupling pillars form an edge coupler 101 configured for optically coupling the optical waveguide 132, 134, 136 to an optical fiber 190 placed at the edge of the semiconductor device 100-1. The optical fiber 190 has an inner diameter 192. In some embodiments, the inner diameter 192 is larger than twice a thickness 122 of the oxide layer 120. In some embodiments, the thickness 122 of the oxide layer 120 is between 2 and 3 micrometers; while the inner diameter 192 of the optical fiber 190 is between 8 and 30 micrometers. Accordingly, the optical fiber 190 has a larger mode size than the optical waveguide 132, 134, 136. The edge coupler 101 thus serves as a mode size converter configured for transmitting optical signals between the optical waveguide 132, 134, 136 and the optical fiber 190. Because a smaller waveguide width leads to a larger mode size, the waveguide at the edge butted to the optical fiber 190 may have tip-like structure like the coupling pillars, which will expand the optical mode size of the semiconductor device 100-1 at the edge. With the structure shown in FIG. 1A and FIG. 1B, the edge coupler 101 can achieve a high coupling efficiency without a need of an undercut in the dielectric layer 120 under the coupling pillar 138 at the edge of the semiconductor device 100-1.

In the example shown in FIG. 1A, one of the plurality of coupling pillars, e.g. the pillar 138, is disposed within the oxide layer 120 and has a taper structure whose width gradually increases along the X direction from a first end inside the semiconductor device 100-1 to a second end at the edge of the semiconductor device 100-1. In some embodiments, the cladding layer 130 comprises a dielectric material; while each of the plurality of coupling pillars 138, 147, 149, 157, 159 . . . 197, 199 comprises a material having a larger refractive index than the dielectric material in the cladding layer 130. The material in each coupling pillar may comprise at least one of: silicon, silicon nitride, silicon carbon, or silicon oxide. In one example, the coupling pillar 138 is formed of silicon; the coupling pillars 147, 149, 157, 159 . . . 197, 199 are formed of silicon carbon; while the cladding layer 130 is formed of silicon oxide.

The long propagation in the optical fiber 190 will randomize the light polarization, suggesting that both transverse electric (TE) and transverse magnetic (TM) lights exist simultaneously. As such, the performance of the edge coupler 101 should take care of both TE and TM functionality. The polarization dependent loss (PDL), defined by the loss difference between TE and TM, becomes an essential metric to evaluate the performance of the edge coupler 101. In some embodiments, both TE and TM lights will be changed by the cross-sectional shape of each coupling pillar and the circular arrangement of the coupling pillars on the surface 102, such that the modes of TE and TM will become polarization-symmetry; i.e. mode shapes of TE and TM look similar, to reduce PDL. In various embodiments, the coupling pillars may have different arrangements on the surface 102.

Figure 2:
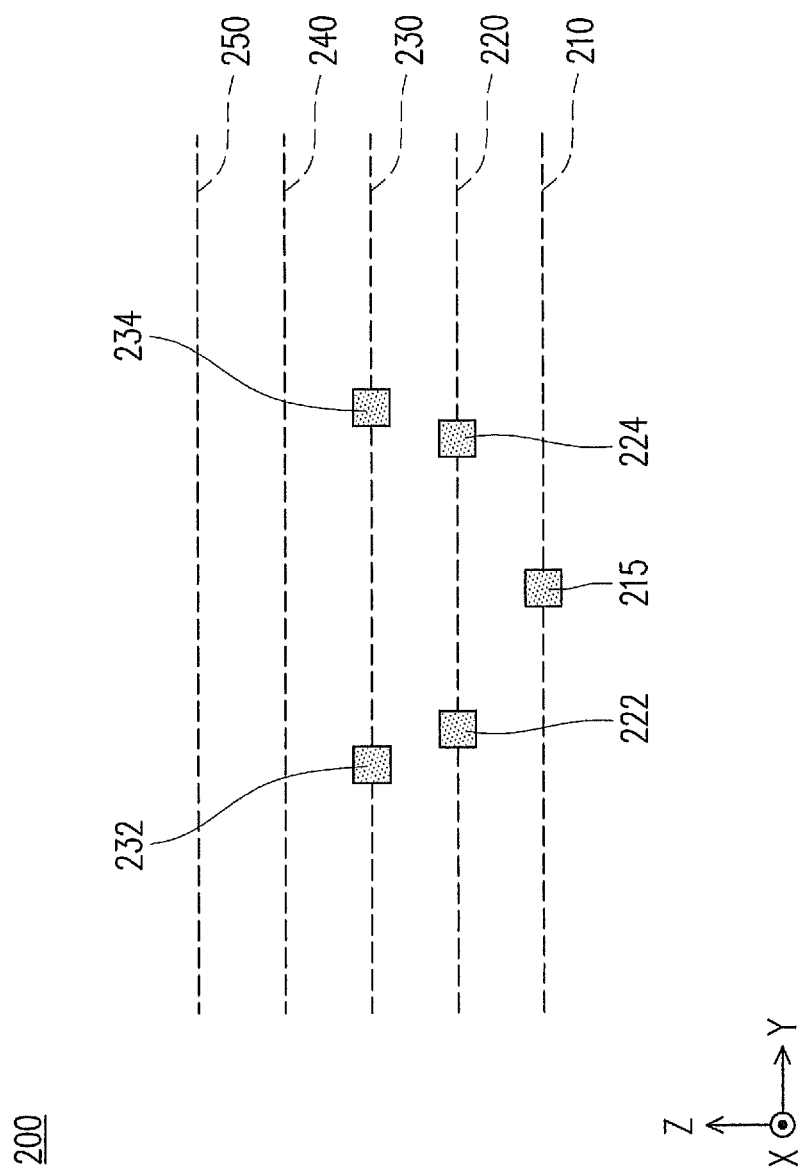
FIG. 2 illustrates a first exemplary arrangement of coupling pillars in a semiconductor device, in accordance with some embodiments of the present disclosure.

FIG. 2 illustrates a first exemplary arrangement 200 of coupling pillars in a semiconductor device, in accordance with some embodiments of the present disclosure. As shown in FIG. 2, a coupling pillar 215 is arranged at layer 210; two coupling pillars 222, 224 are arranged at layer 220; and two coupling pillars 232, 234 are arranged at layer 230. The coupling pillars 215, 222, 224, 232, 234 are arranged at locations forming a shape of a half circle.

Figure 3:
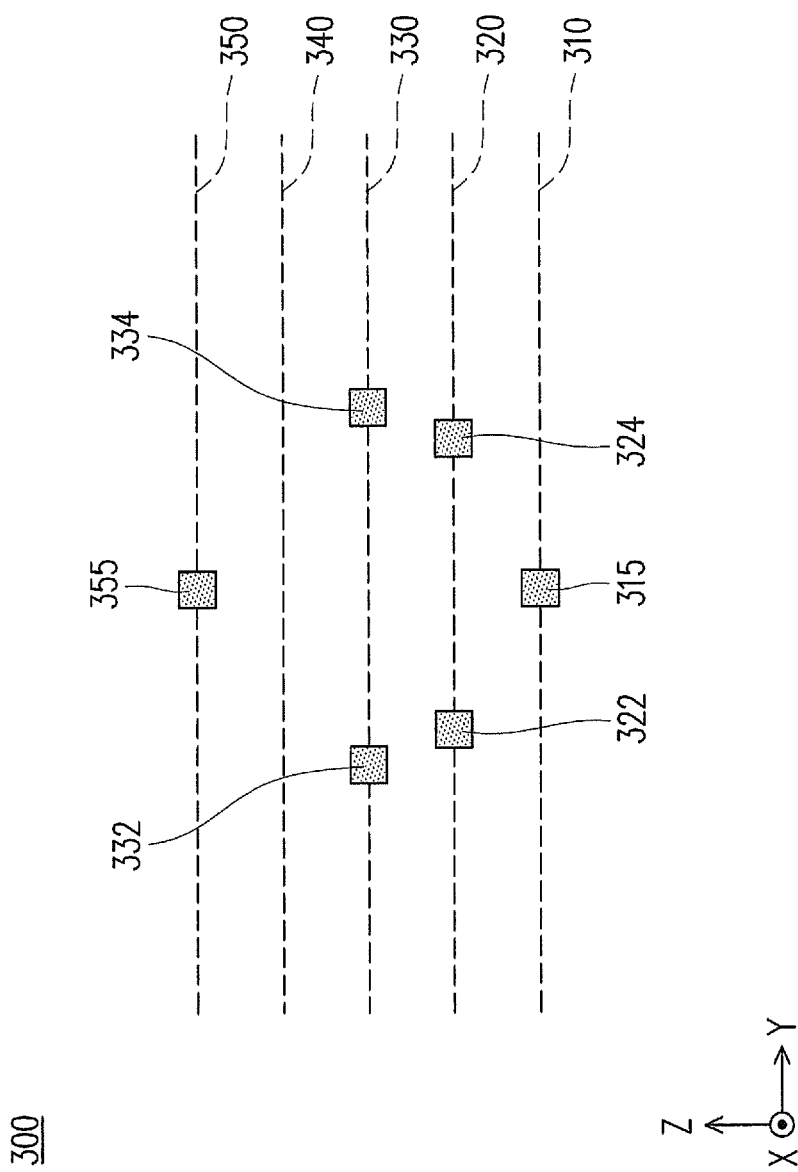
FIG. 3 illustrates a second exemplary arrangement of coupling pillars in a semiconductor device, in accordance with some embodiments of the present disclosure.

FIG. 3 illustrates a second exemplary arrangement 300 of coupling pillars in a semiconductor device, in accordance with some embodiments of the present disclosure. As shown in FIG. 3, a coupling pillar 315 is arranged at layer 310; two coupling pillars 322, 324 are arranged at layer 320; two coupling pillars 332, 334 are arranged at layer 330; and a coupling pillar 355 is arranged at layer 350. The coupling pillars 315, 322, 324, 332, 334, 355 are arranged at locations forming a shape, whose lower portion is a half circle and whose upper portion is a triangle.

Figure 4:
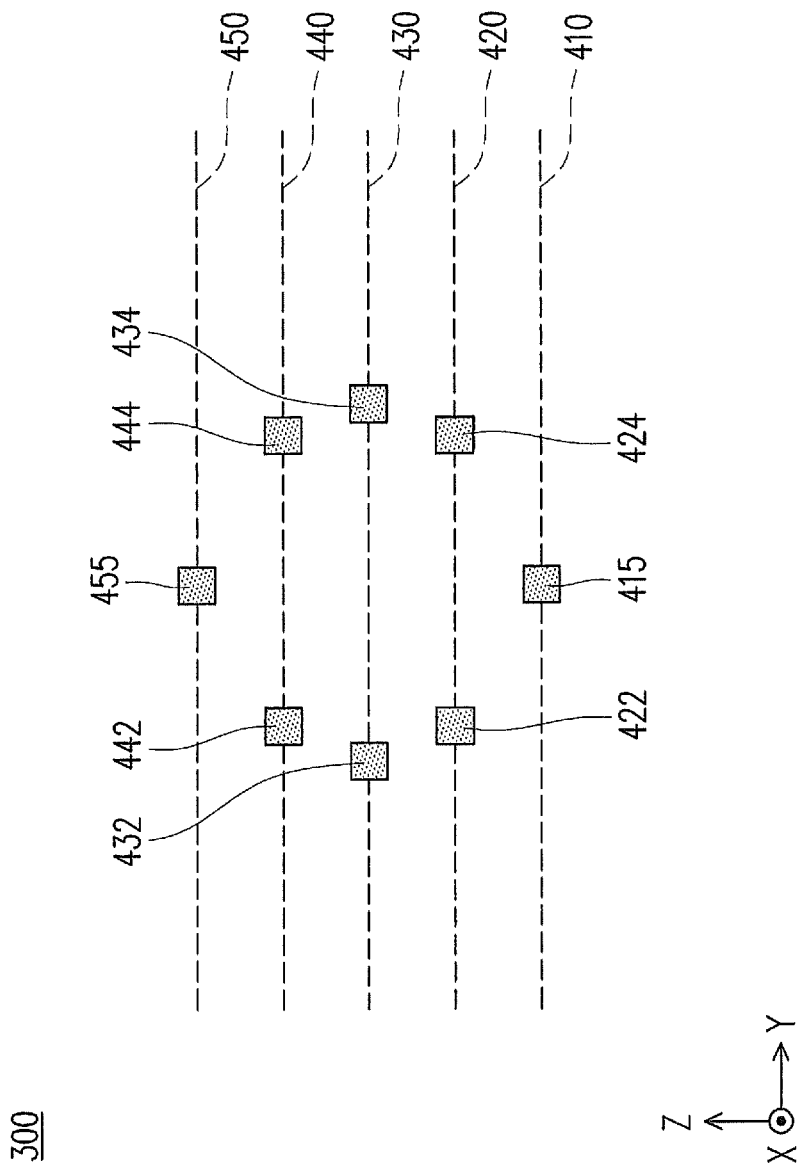
FIG. 4 illustrates a third exemplary arrangement of coupling pillars in a semiconductor device, in accordance with some embodiments of the present disclosure.

FIG. 4 illustrates a third exemplary arrangement of coupling pillars in a semiconductor device, in accordance with some embodiments of the present disclosure. As shown in FIG. 4, a coupling pillar 415 is arranged at layer 410; two coupling pillars 422, 424 are arranged at layer 420; two coupling pillars 432, 434 are arranged at layer 430; two coupling pillars 442, 444 are arranged at layer 440; and a coupling pillar 455 is arranged at layer 450. The coupling pillars 415, 422, 424, 432, 434, 442, 444, 455 are arranged at locations forming a shape of a circle.

Figure 5:
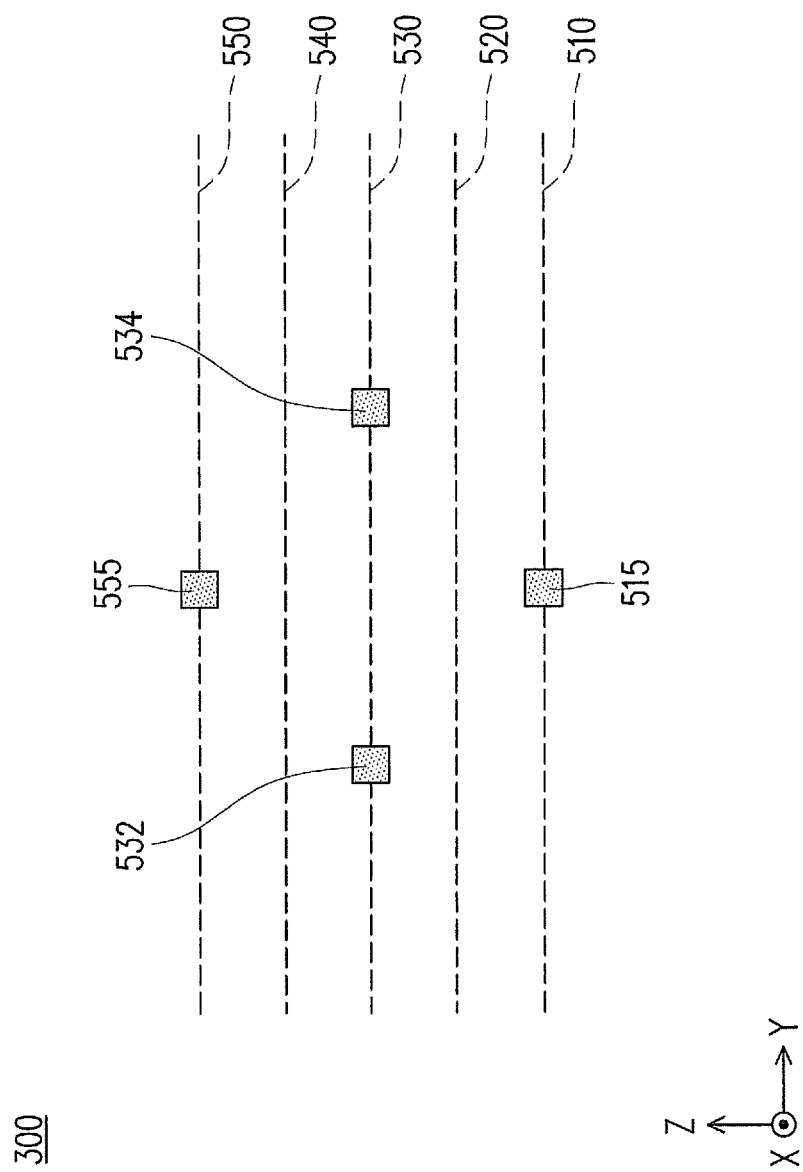
FIG. 5 illustrates a fourth exemplary arrangement of coupling pillars in a semiconductor device, in accordance with some embodiments of the present disclosure.

FIG. 5 illustrates a fourth exemplary arrangement of coupling pillars in a semiconductor device, in accordance with some embodiments of the present disclosure. As shown in FIG. 5, a coupling pillar 515 is arranged at layer 510; two coupling pillars 532, 534 are arranged at layer 530; and a coupling pillar 555 is arranged at layer 550. The coupling pillars 515, 532, 534, 555 are arranged at locations forming a shape of a diamond or a square.

Each layer in FIGS. 2-5 may correspond to a dielectric layer or an IMD layer shown in FIG. 1A. The coupling pillars of the semiconductor device form an edge coupler, whose coupling efficiency may be different depending on an arrangement of the coupling pillars in different shapes and/or sizes. For example, the circle formed by the coupling pillars 415, 422, 424, 432, 434, 442, 444, 455 in FIG. 4 may have a radius of about 1 micrometer. In some embodiments, each coupling pillar in FIGS. 2-5 may have a width of about 0.2 micrometer along the Y direction; and have a thickness of about 0.2 micrometer along the Z direction.

Figure 6A:
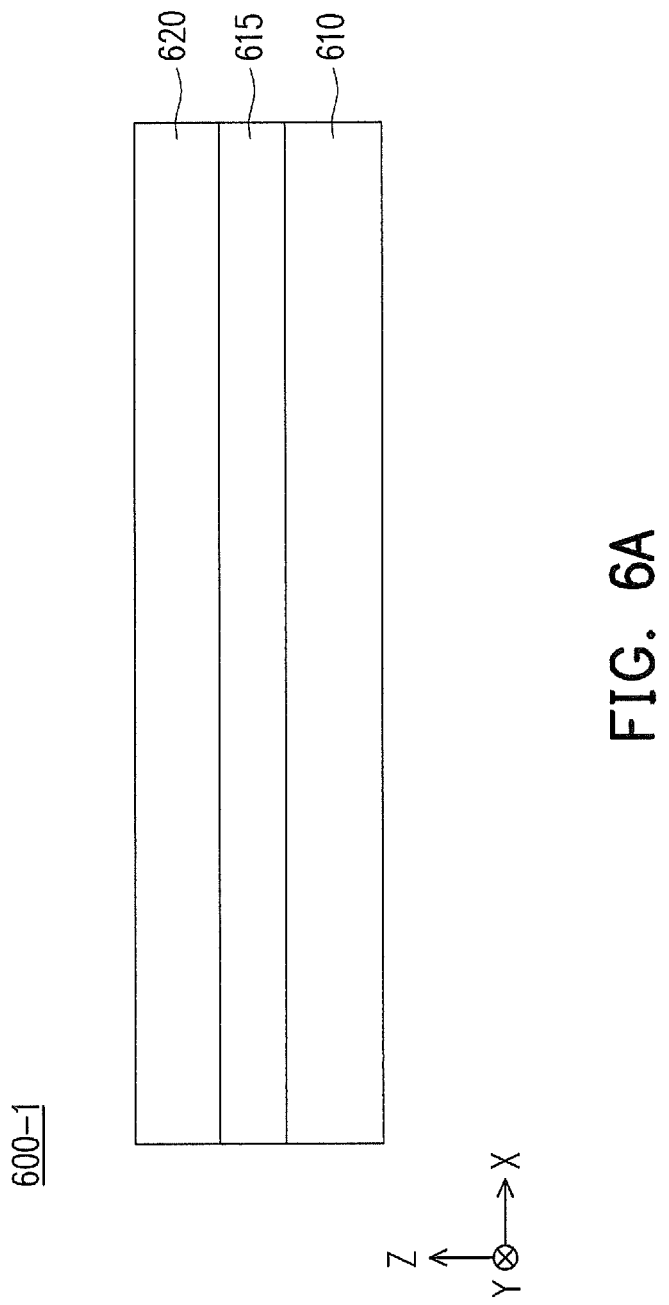
FIGS. 6A-6J illustrate cross-sectional views of an exemplary optical waveguide at various stages of a fabrication process, in accordance with some embodiments of the present disclosure.

FIGS. 6A-6J illustrate cross-sectional views of an exemplary optical waveguide 600 at various stages of a fabrication process, in accordance with some embodiments of the present disclosure. FIG. 6A is a cross-sectional view of the optical waveguide 600 including a silicon-on-insulator (SOI) substrate, which includes a first layer 610, a second layer 615 disposed on the first layer 610, and a third layer 620 disposed on the second layer 615, at one of the various stages of fabrication, according to some embodiments of the present disclosure. The first layer 610 may be formed of silicon, or another semiconductor material. The second layer 615 may be formed of silicon oxide, or another oxide material. The third layer 620 may be formed of silicon, or another semiconductor material.

Figure 6B:
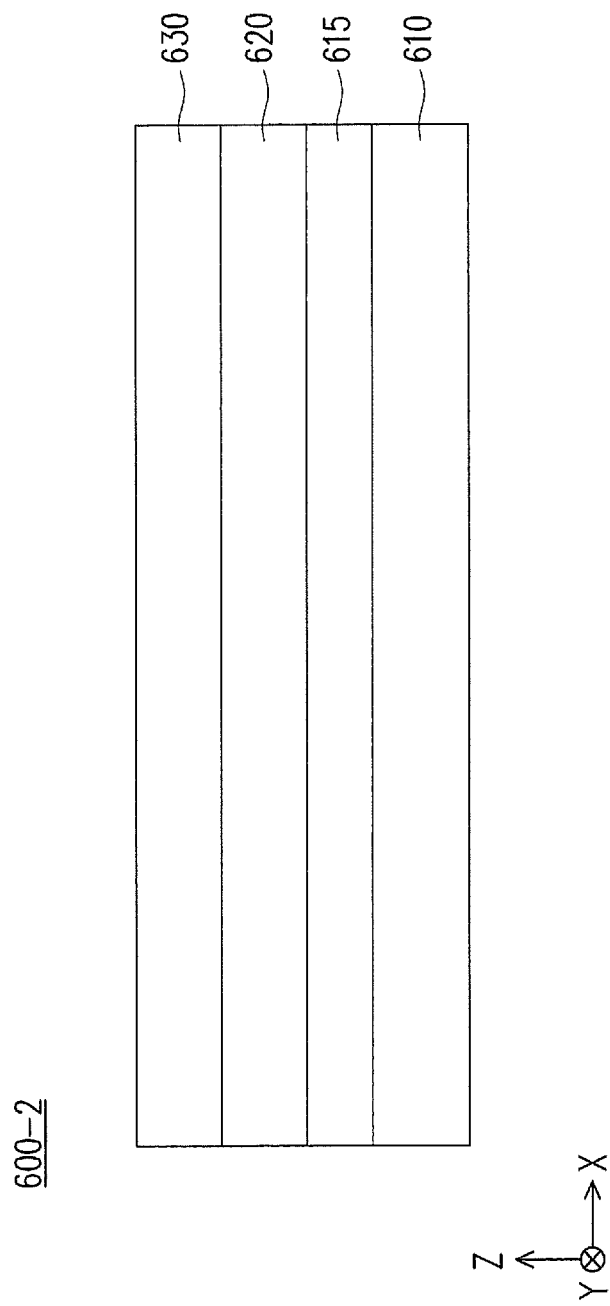

FIG. 6B is a cross-sectional view of the optical waveguide 600 including a masking layer 630 formed on the silicon layer 620 at one of the various stages of fabrication, according to some embodiments of the present disclosure. The coated masking layer 630 on the silicon layer 620 may comprise a photoresist (PR) material.

Figure 6C:
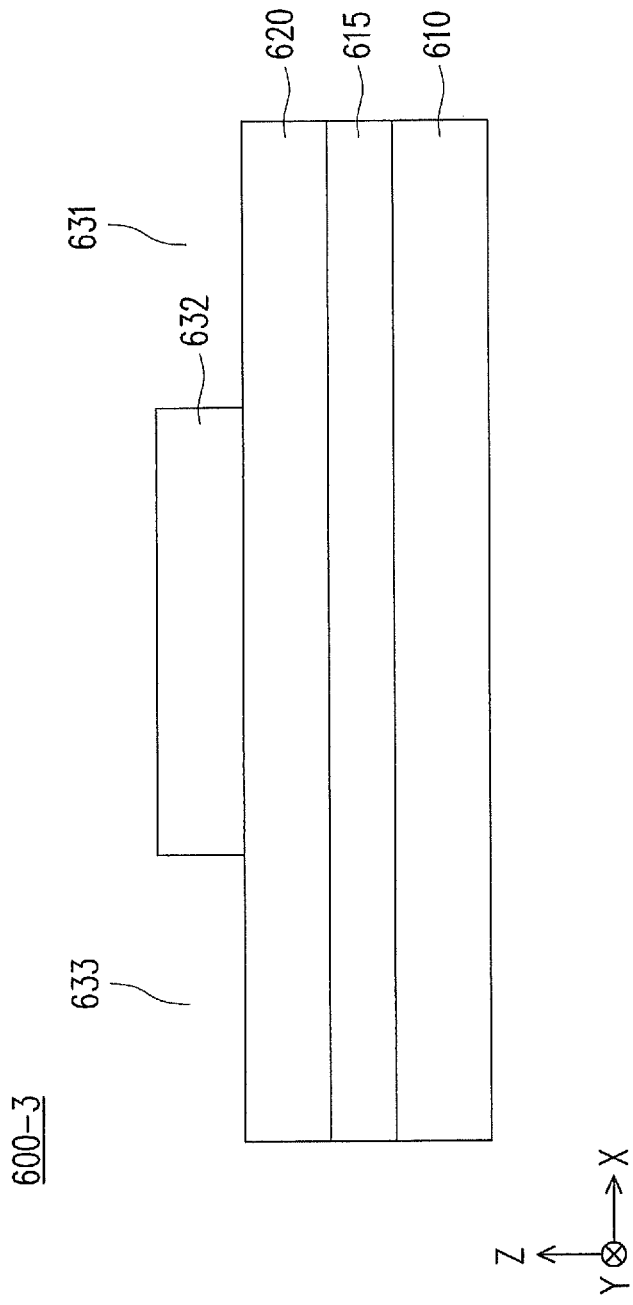

FIG. 6C is a cross-sectional view of the optical waveguide 600 including a middle portion 632 of the masking layer 630, which is formed on the silicon layer 620 at one of the various stages of fabrication, according to some embodiments of the present disclosure. The masking layer 630 is patterned to have the middle portion 632 left on the silicon layer 620, e.g. by removing the left portion 633 and the right portion 631 based on waveguide lithography and development.

Figure 6D:
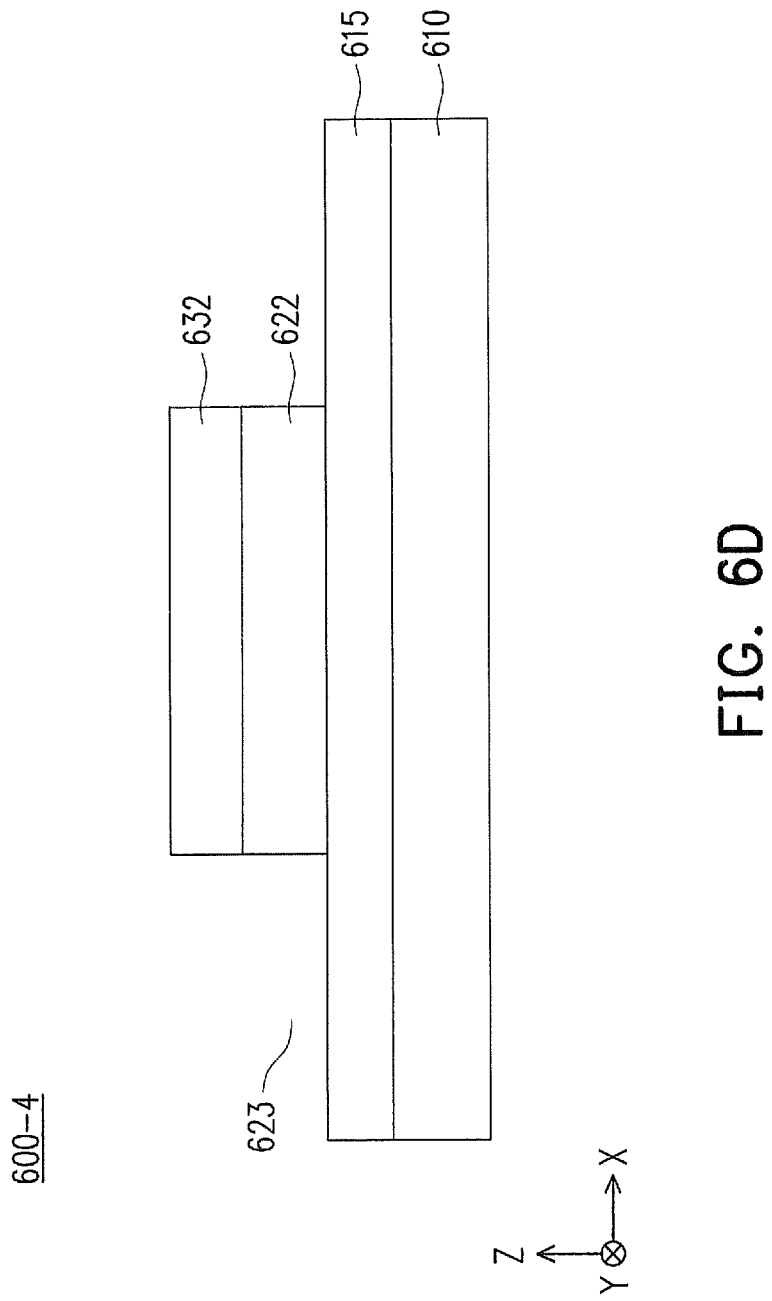

FIG. 6D is a cross-sectional view of the optical waveguide 600 including a middle portion 622 of the silicon layer 620, which is formed at one of the various stages of fabrication, according to some embodiments of the present disclosure. Because the masking layer 630 was patterned to have openings over the left and right portions 623, 621 of the silicon layer 620, the left and right portions 623, 621 that are left exposed by the masking layer are removed, e.g., via a wet or dry etch procedure.

Figure 6E:
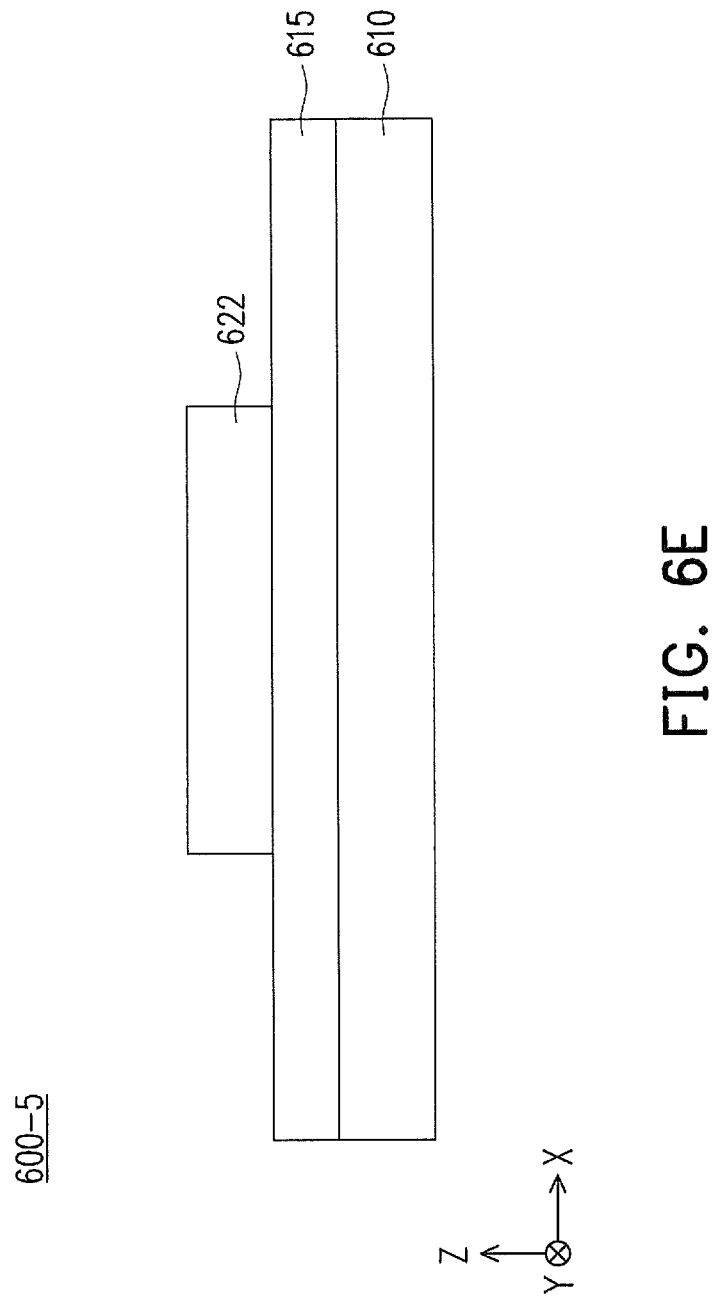

FIG. 6E is a cross-sectional view of the optical waveguide 600, where the masking layer 632 is removed at one of the various stages of fabrication, according to some embodiments of the present disclosure. For example, the masking layer 632 may be removed by a resist stripping.

Figure 6F:
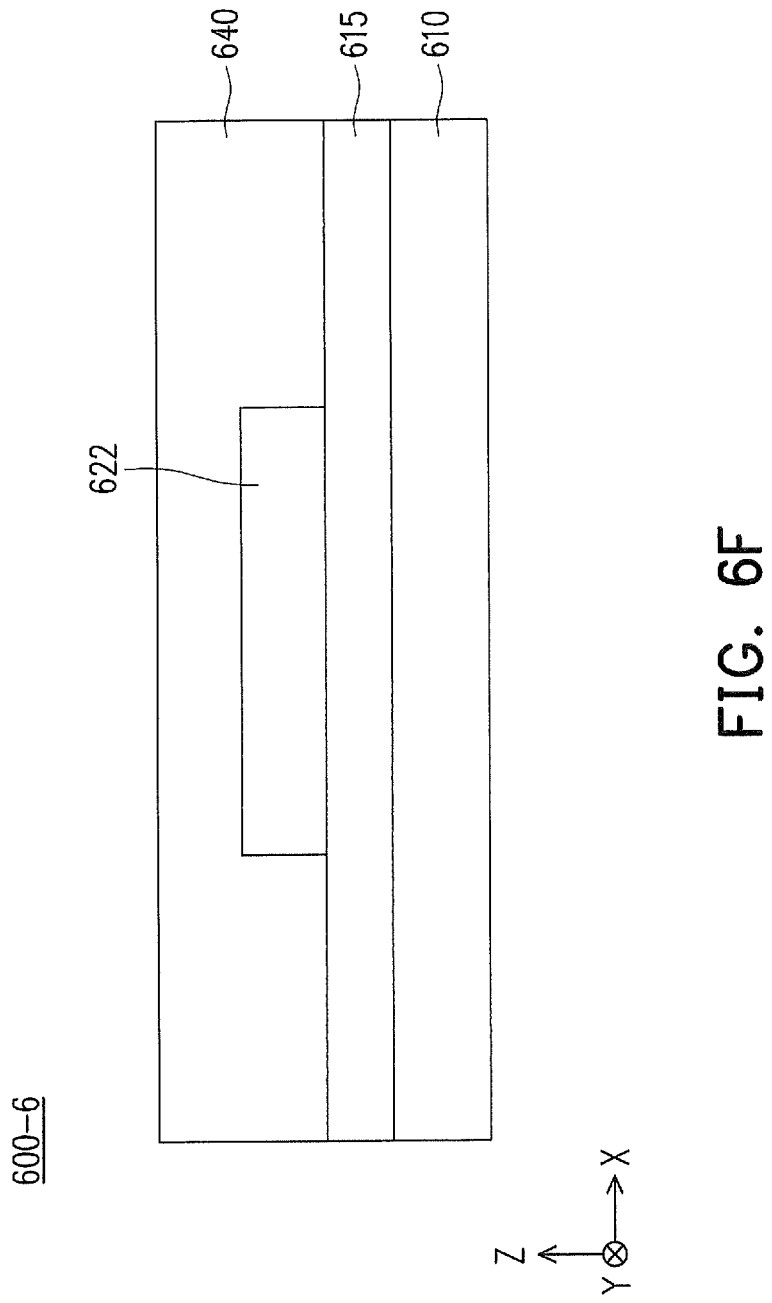

FIG. 6F is a cross-sectional view of the optical waveguide 600 including another masking layer 640, which is formed on the remaining silicone layer 622 at one of the various stages of fabrication, according to some embodiments of the present disclosure. The coated masking layer 640 on the silicone layer 622 may comprise a photoresist (PR) material. As shown in FIG. 6F, the coated masking layer 640 covers not only the silicone layer 622, but also the left and right portions of the first layer 610.

Figure 6G:
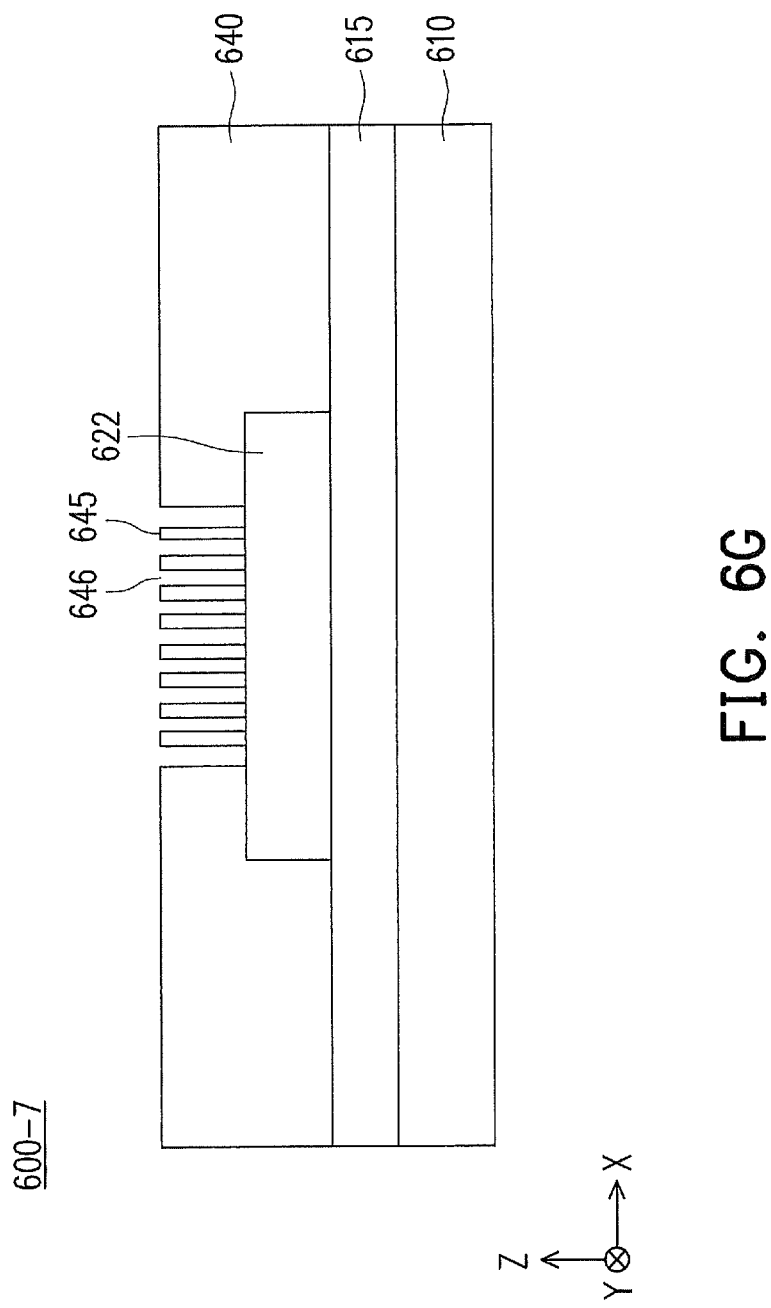

FIG. 6G is a cross-sectional view of the optical waveguide 600 including a plurality of trenches 646, which is formed on the silicon layer 622 at one of the various stages of fabrication, according to some embodiments of the present disclosure. Based on waveguide lithography and development, the masking layer 640 is patterned to include a plurality of stacks 645 formed on the silicon layer 622, e.g. by etching the masking layer 640 to form a plurality of trenches 646 between the plurality of stacks 645.

Figure 6H:
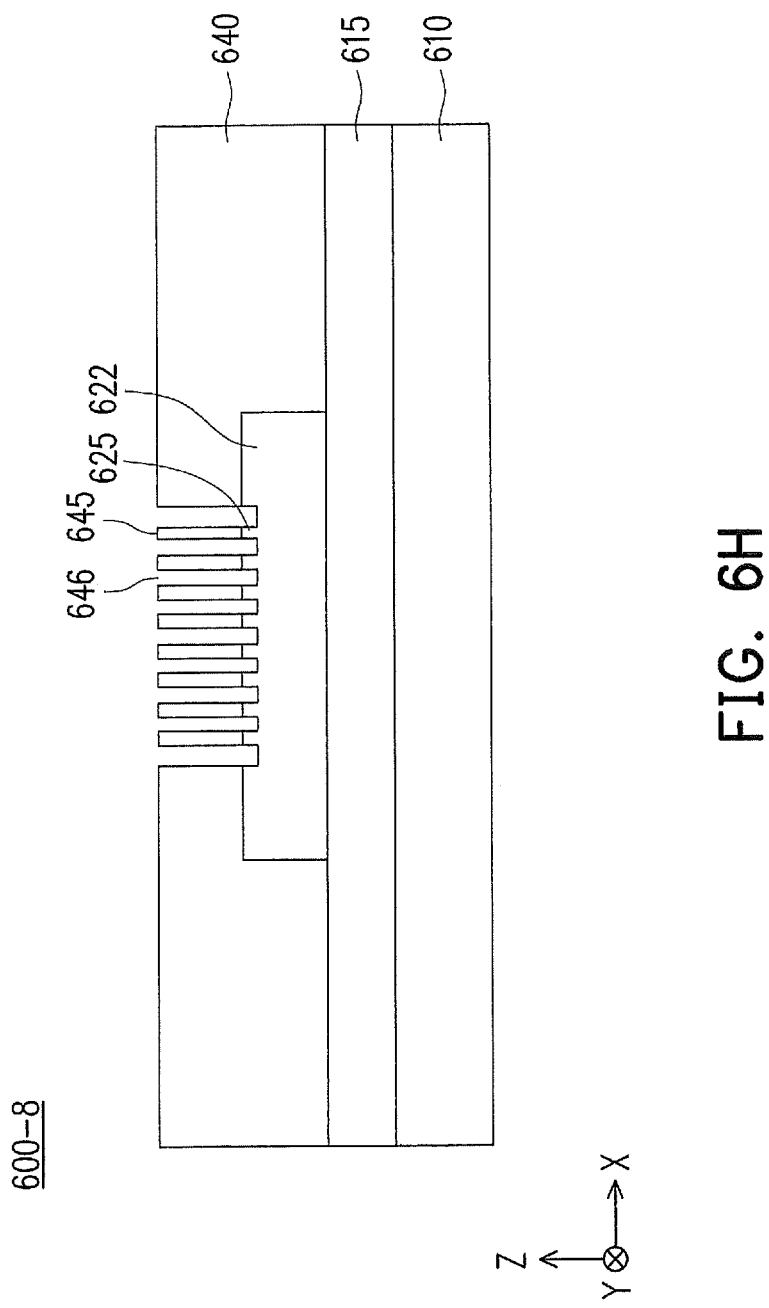

FIG. 6H is a cross-sectional view of the optical waveguide 600 including a plurality of gratings 625, which is formed at one of the various stages of fabrication, according to some embodiments of the present disclosure. Because the masking layer 640 was patterned to have openings 646 over the silicon layer 622, the exposed portions of the silicon layer 622 are removed, e.g., via a wet or dry etch procedure, to form the plurality of gratings 625.

Figure 6I:
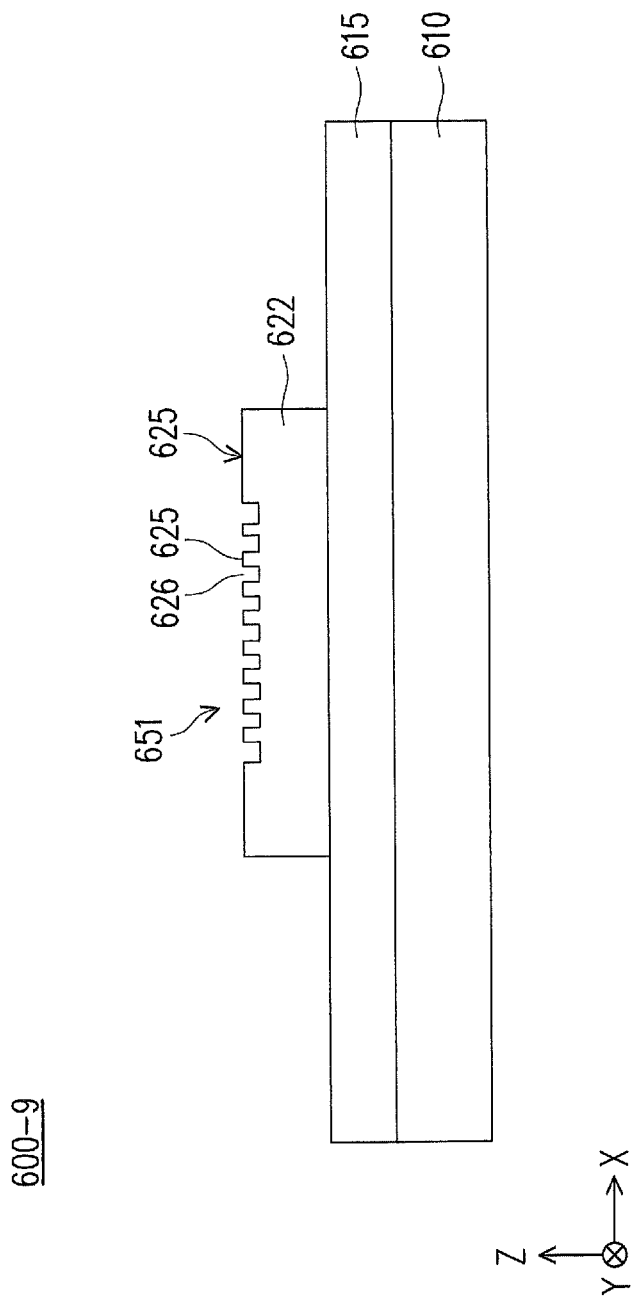

FIG. 6I is a cross-sectional view of the optical waveguide 600, where the masking layer 640 is removed at one of the various stages of fabrication, according to some embodiments of the present disclosure. For example, the masking layer 640 may be removed by a resist stripping. In the embodiment shown in FIG. 6I, the silicon layer 622 includes a grating portion 651 and a waveguide portion 652 coupled to the grating portion 651. The grating portion 651 includes a plurality of coupling gratings 625 separated by shallow trenches 626. The shallow trenches 626 may be formed by a single-step etching process.

Figure 6J:
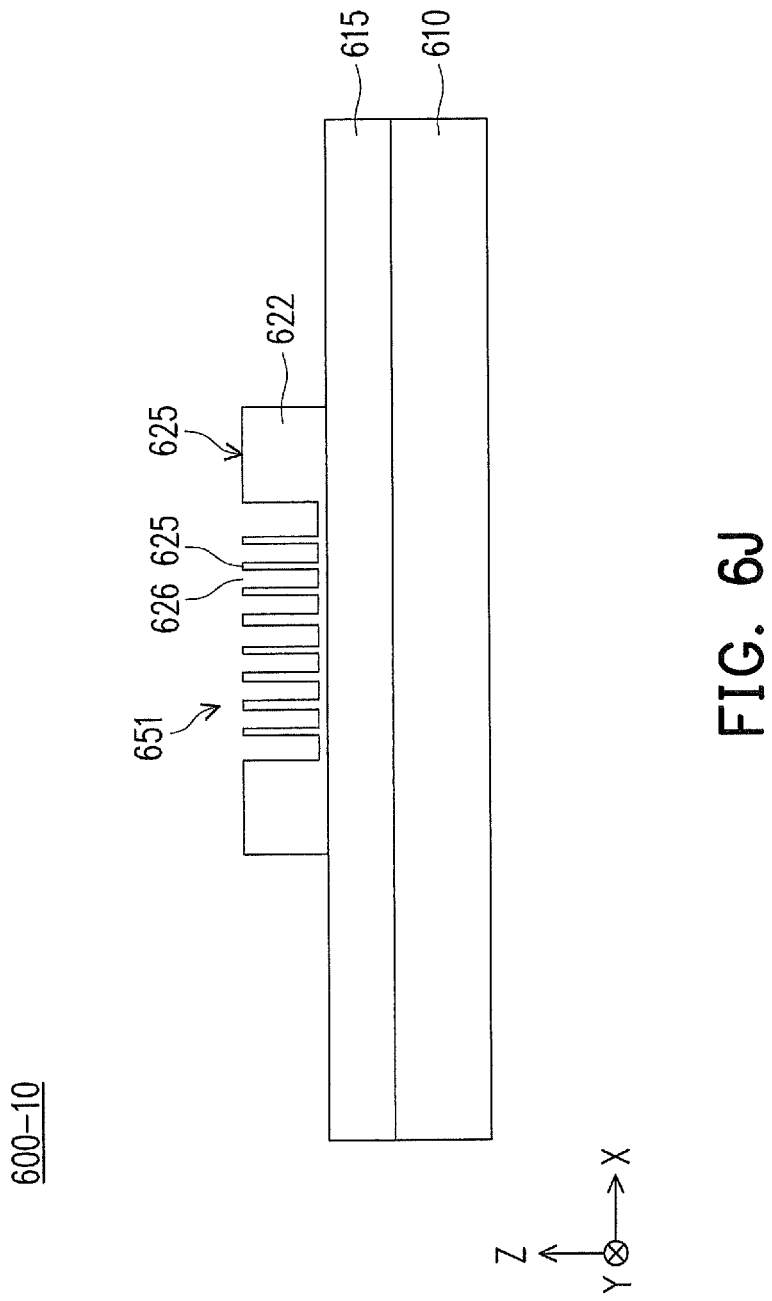

FIG. 6J is a cross-sectional view of the optical waveguide 600, where the masking layer 640 is removed at one of the various stages of fabrication, according to some embodiments of the present disclosure. In the embodiment shown in FIG. 6J, the silicon layer 622 includes a grating portion 651 and a waveguide portion 652 coupled to the grating portion 651. The grating portion 651 includes a plurality of coupling gratings 625 separated by deep trenches 626. The deep trenches 626 may be formed by a multi-step etching process. For example, with the patterned masking layer 640 over the silicon layer 622 shown in FIG. 6H, at least two or three steps of etching may be performed on the exposed portions of the silicon layer 622 to form the plurality of high gratings 625 shown in FIG. 6J.

According to various embodiments, a disclosed semiconductor device may include either coupling gratings separated by shallow trenches as shown in FIG. 6I, or coupling gratings separated by deep trenches as shown in FIG. 6J. In some embodiments, the coupling gratings in a disclosed semiconductor device may be different in terms of: shape, height, width, and/or length, e.g. based on waveguide lithography and development with a masking layer 640 at stage 600-7 in FIG. 6G, when the masking layer 640 follows different patterns and/or when the etching process after the stage 600-7 has different time durations or depths.

Figure 7A:
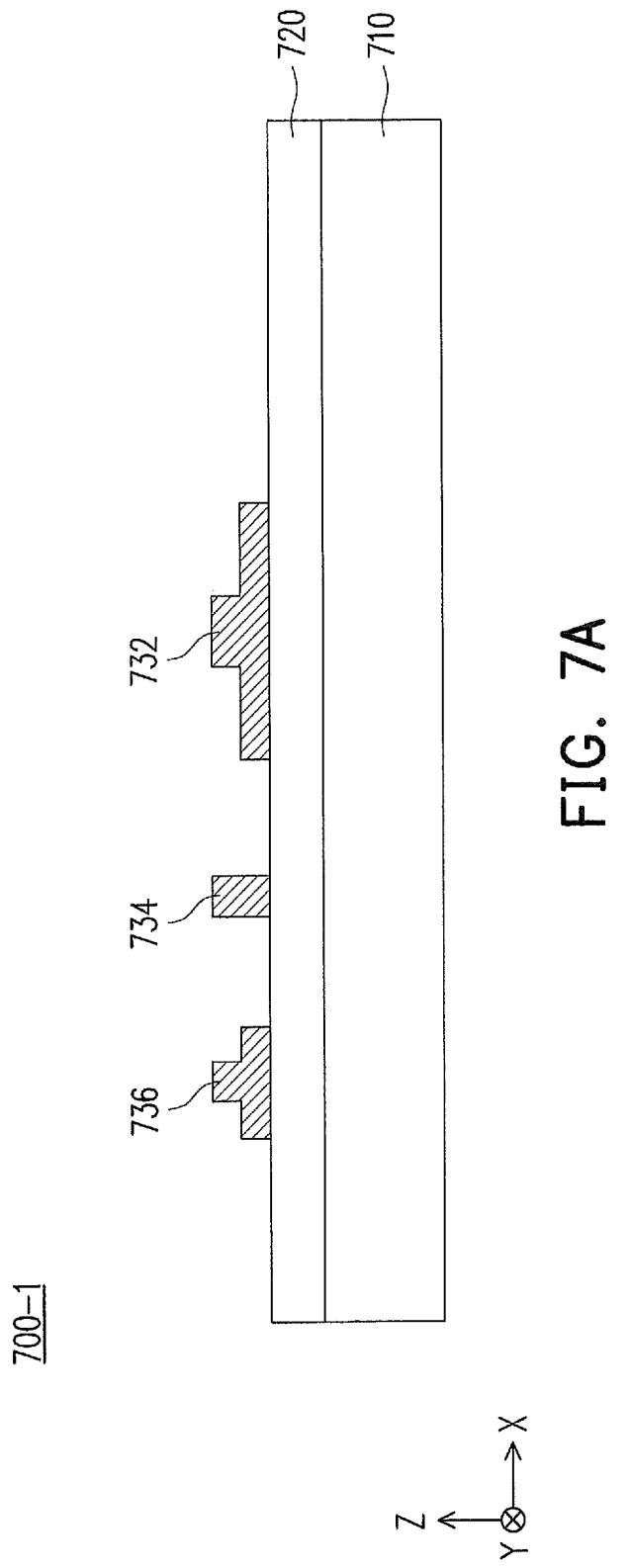
FIGS. 7A-7P illustrate cross-sectional views of an exemplary semiconductor device including an edge coupler at various stages of a fabrication process, in accordance with some embodiments of the present disclosure.
Figure 7B:
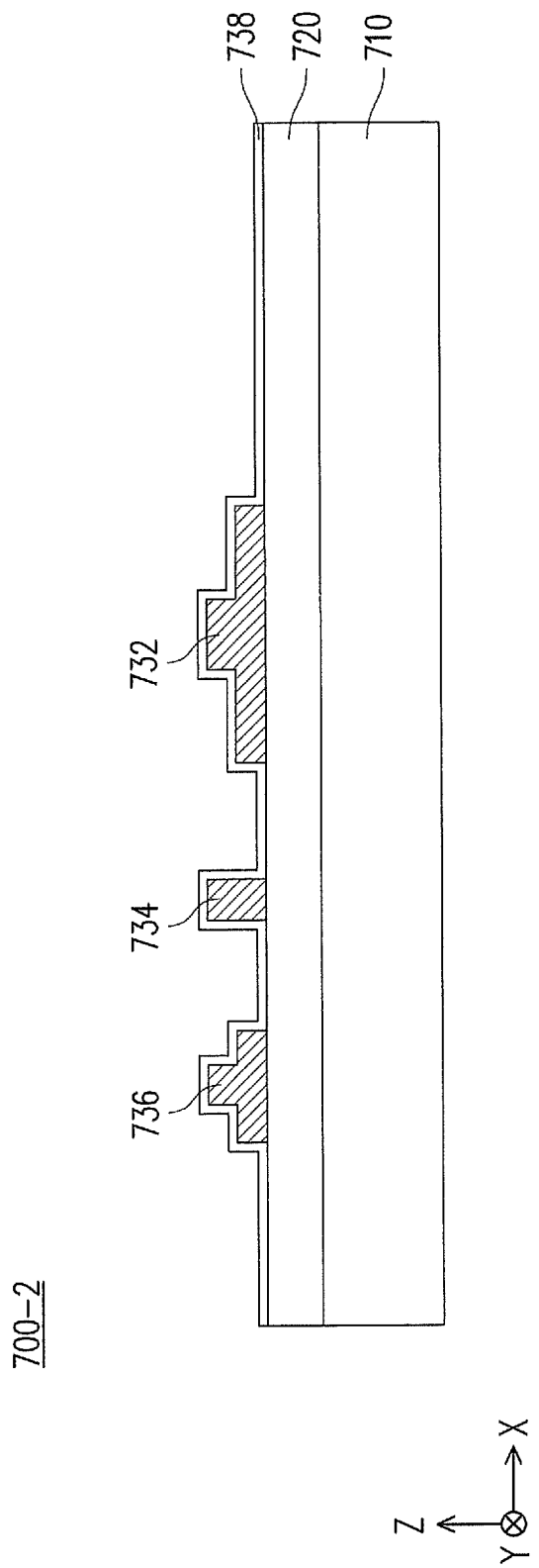
Figure 7C:
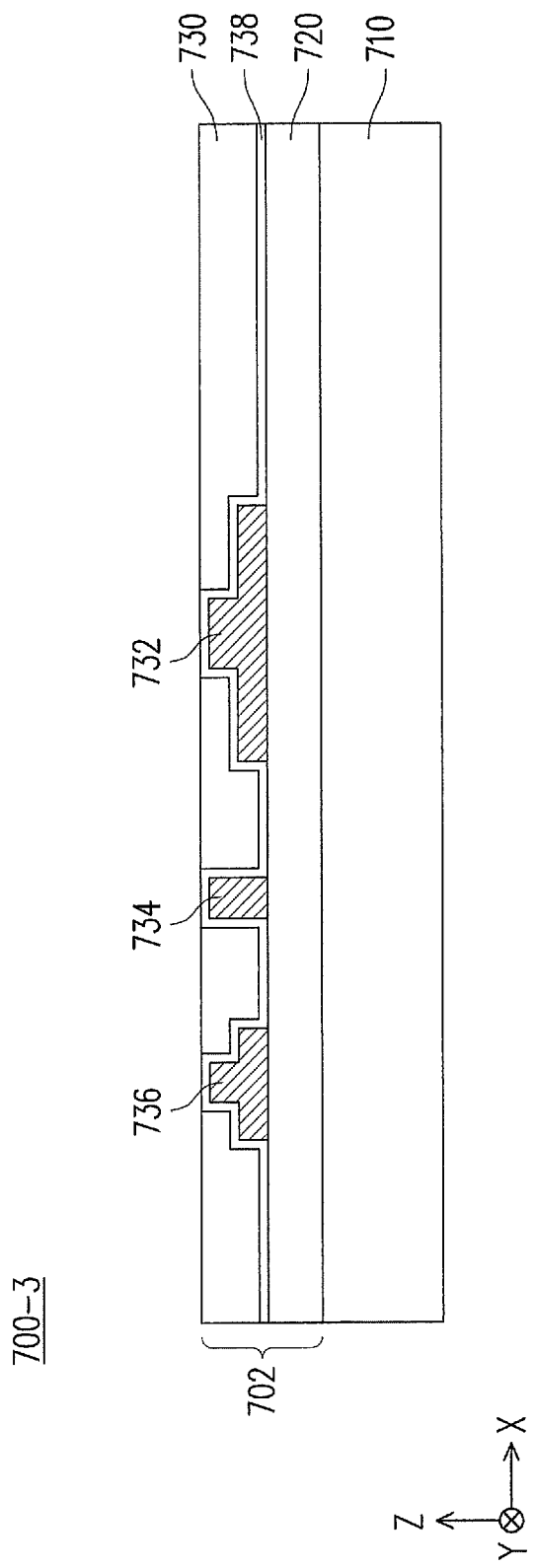
Figure 7D:
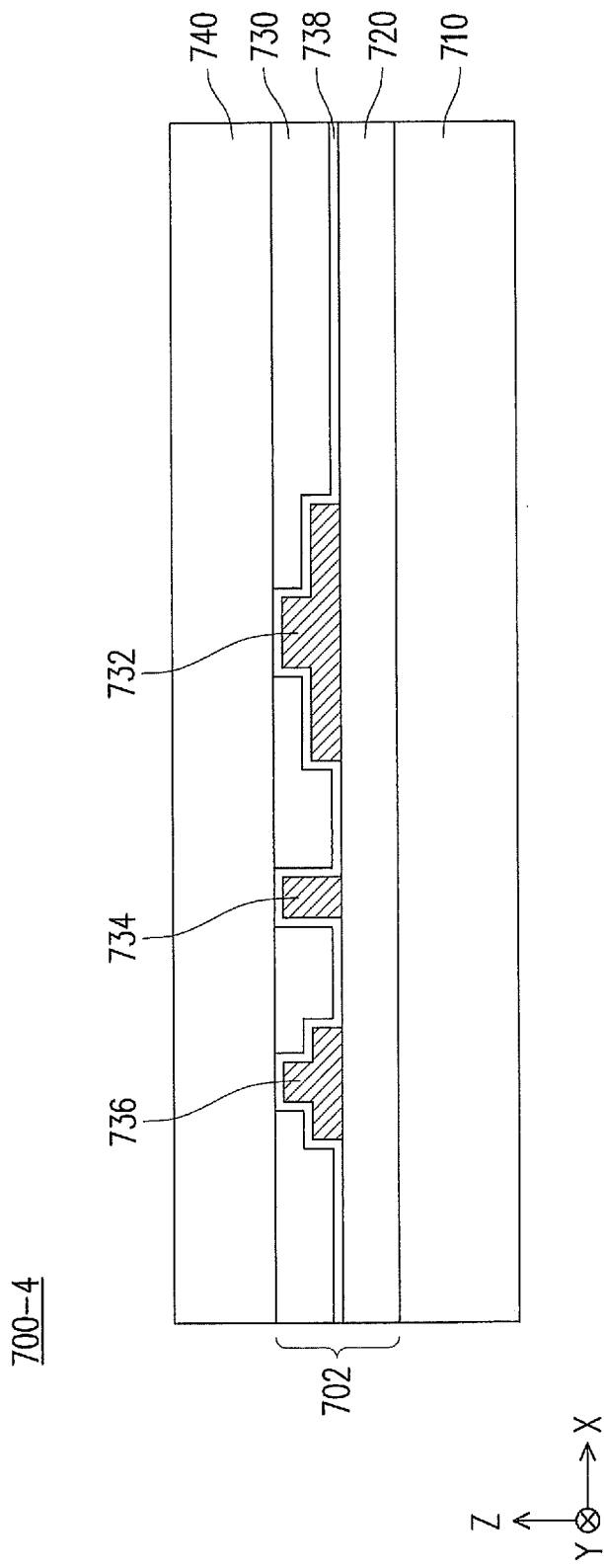
Figure 7E:
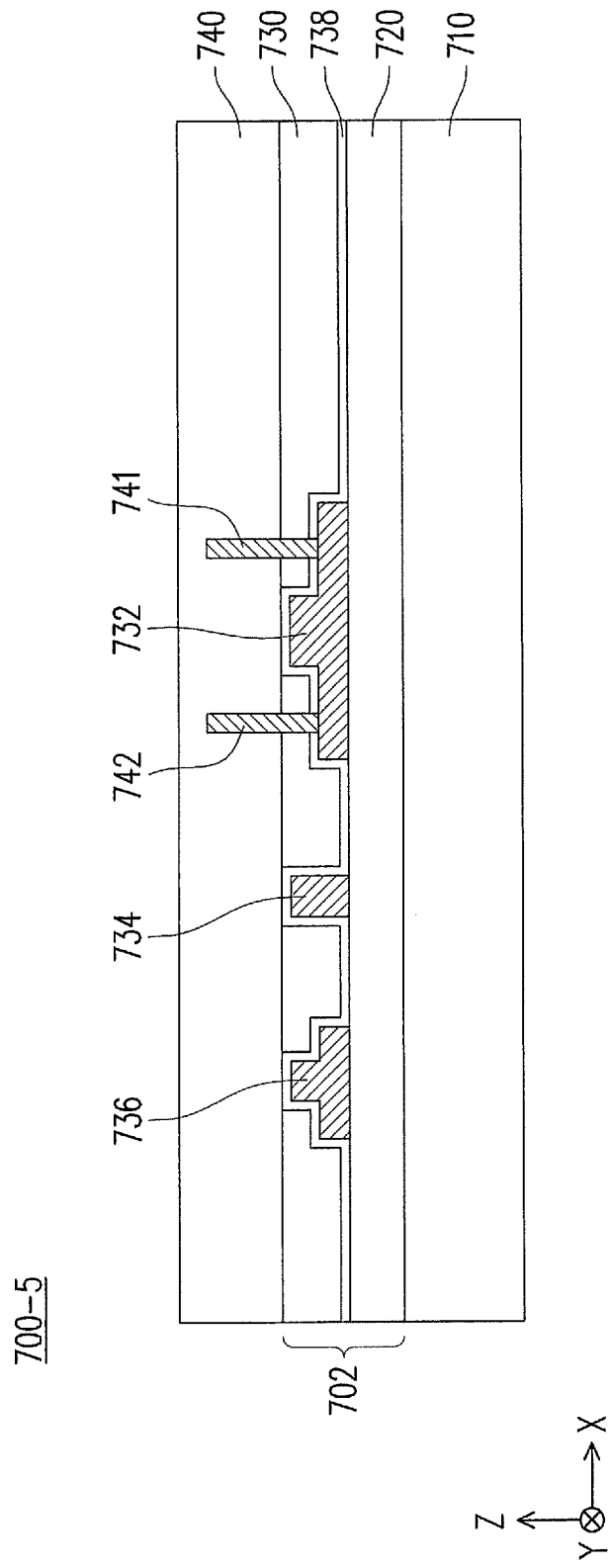
Figure 7F:
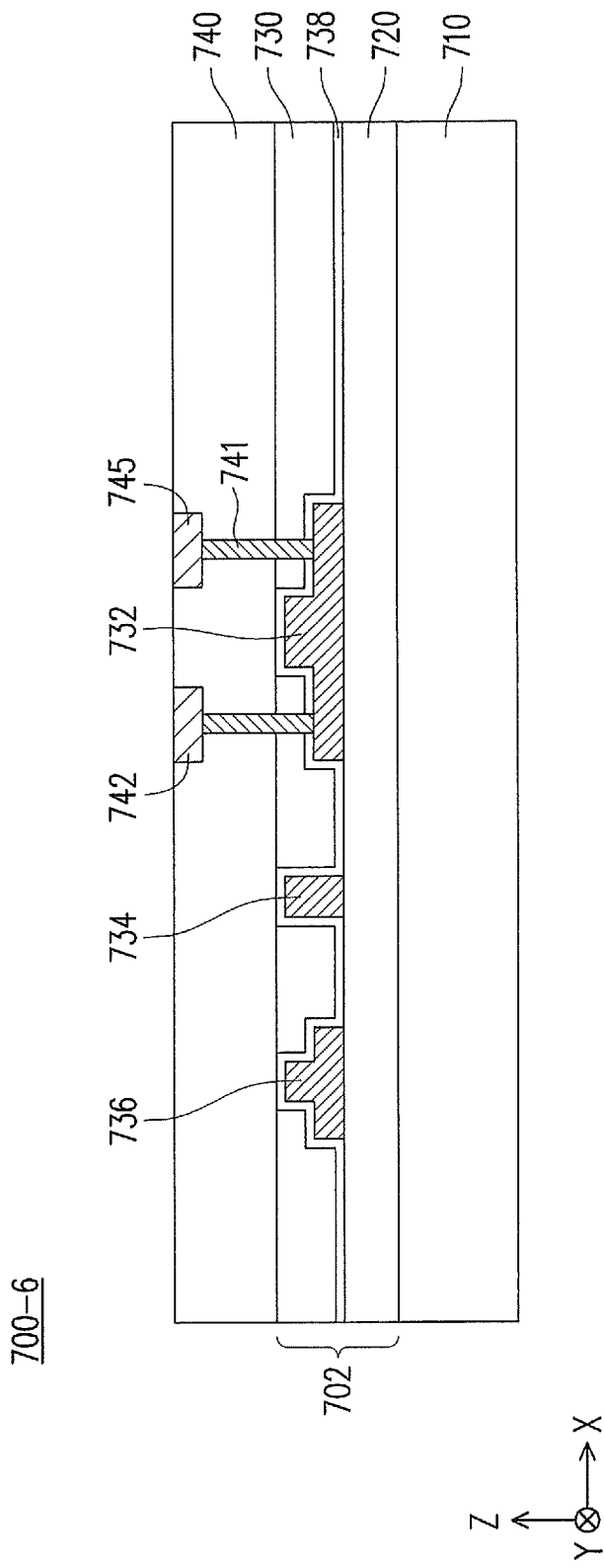
Figure 7G:
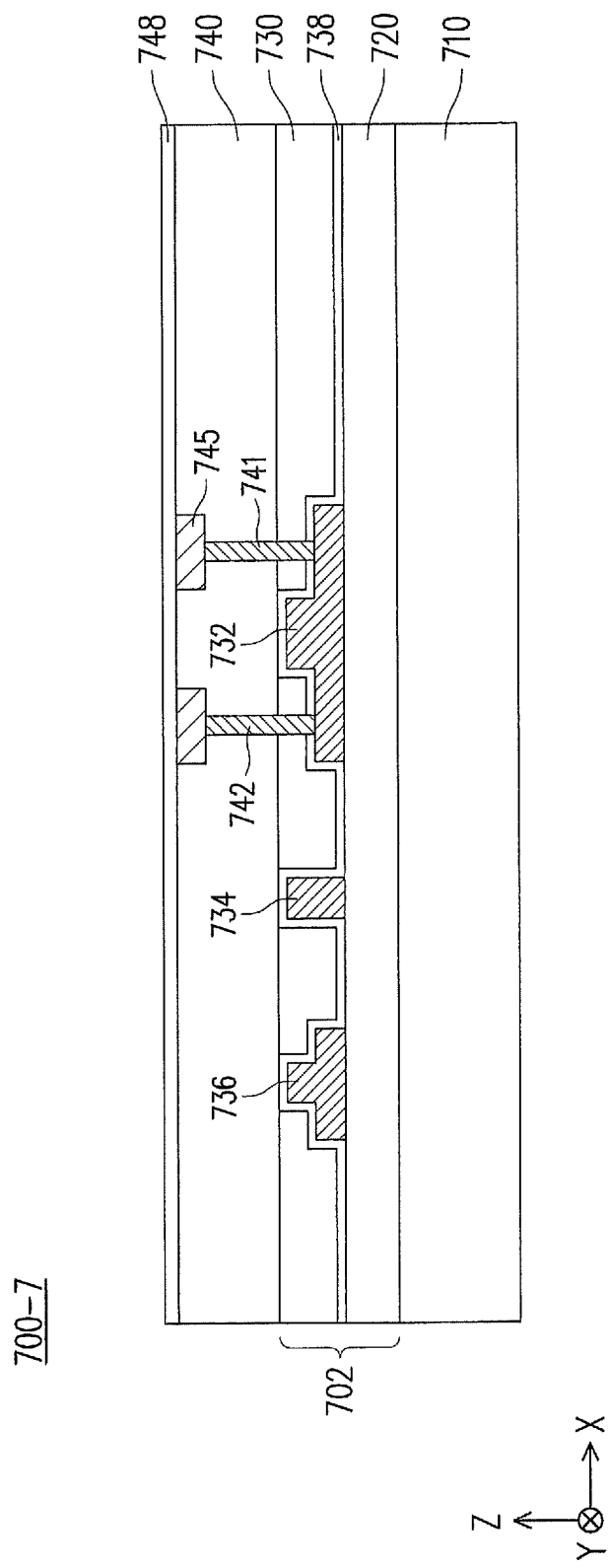
Figure 7H:
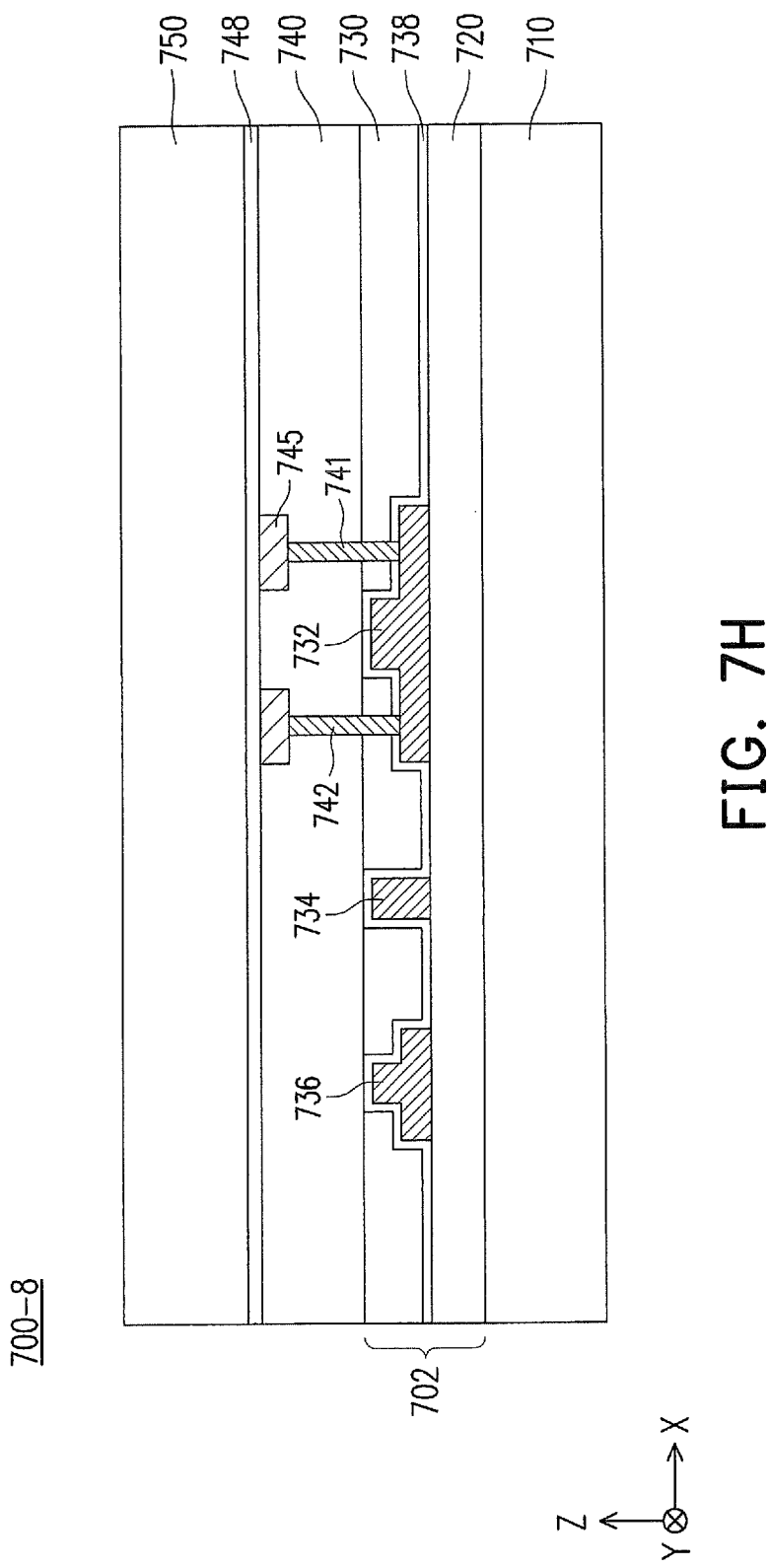
Figure 7I:
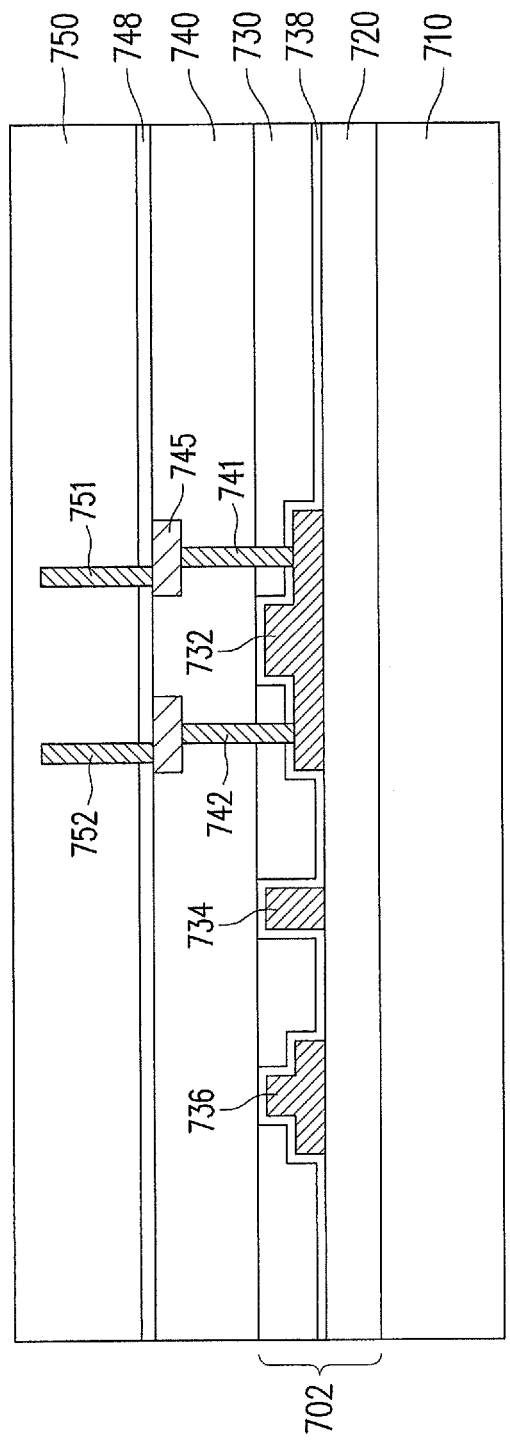
Figure 7J:
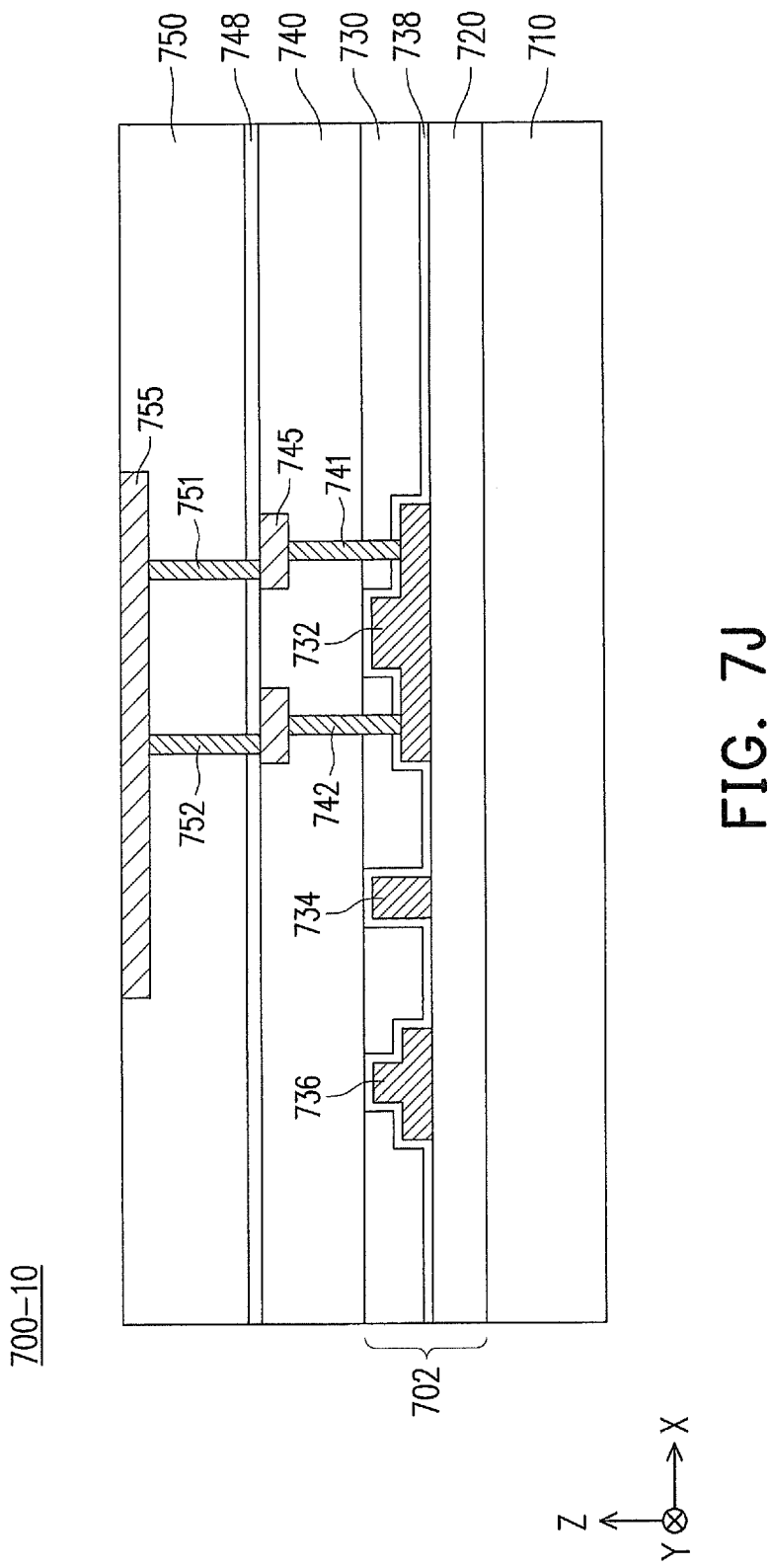
Figure 7K:
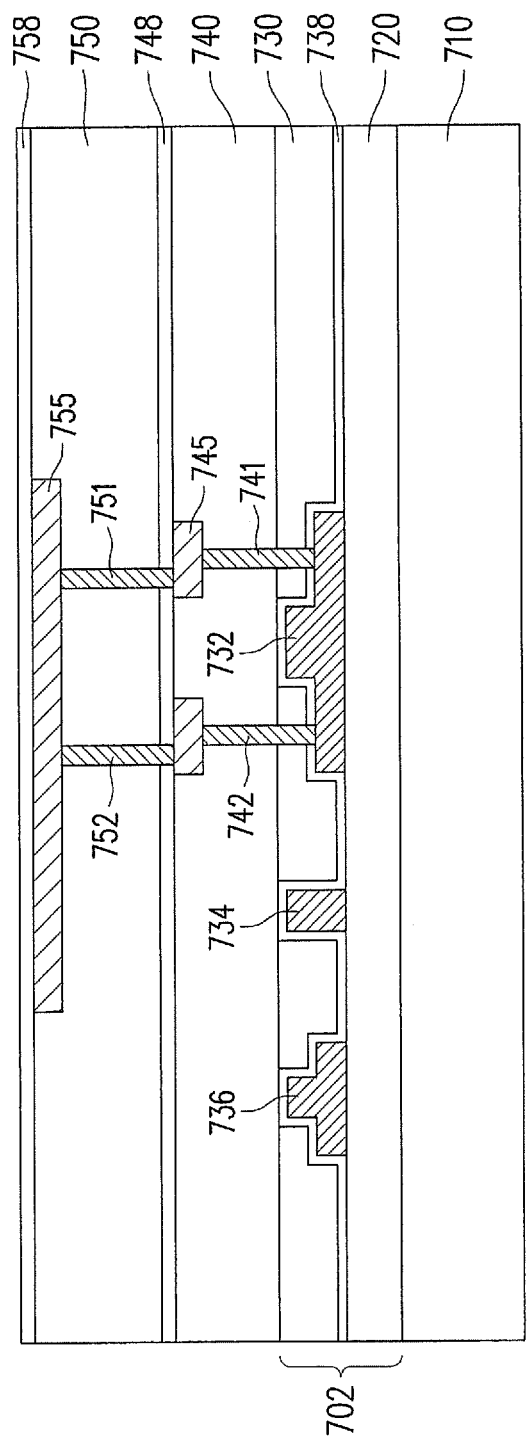
Figure 7L:
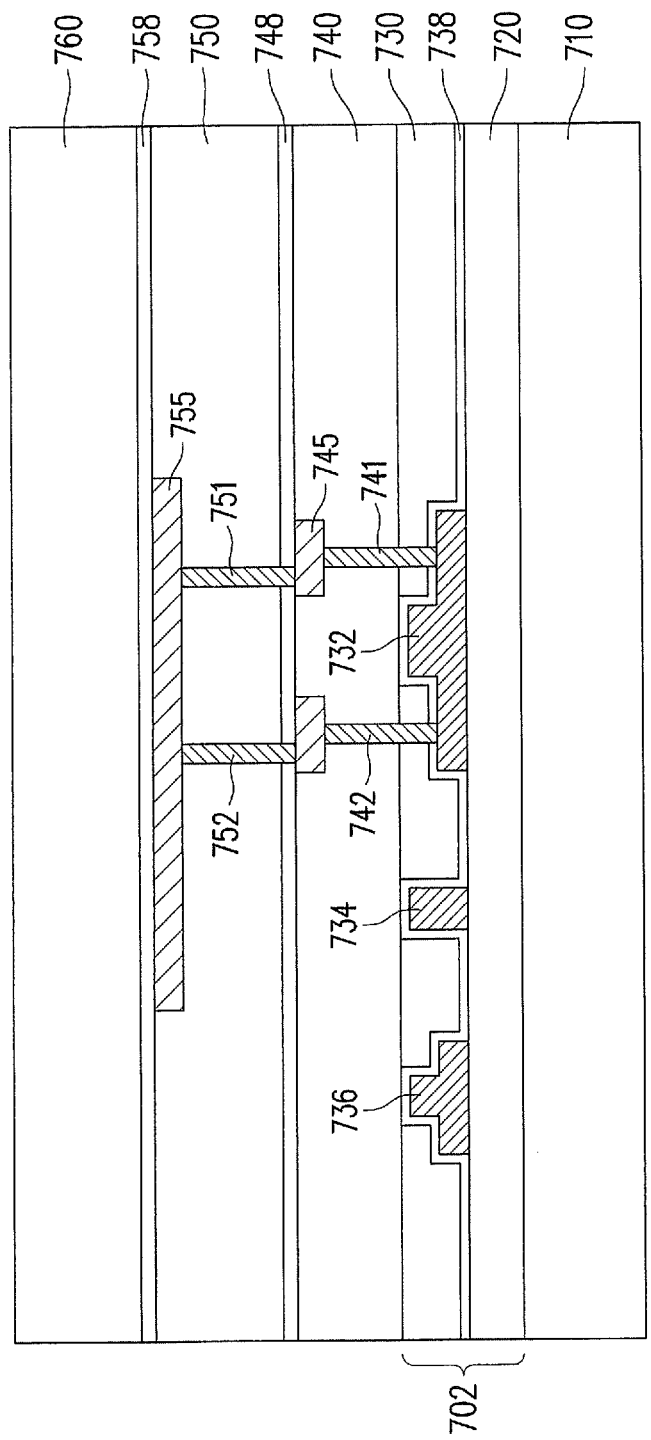
Figure 7M:
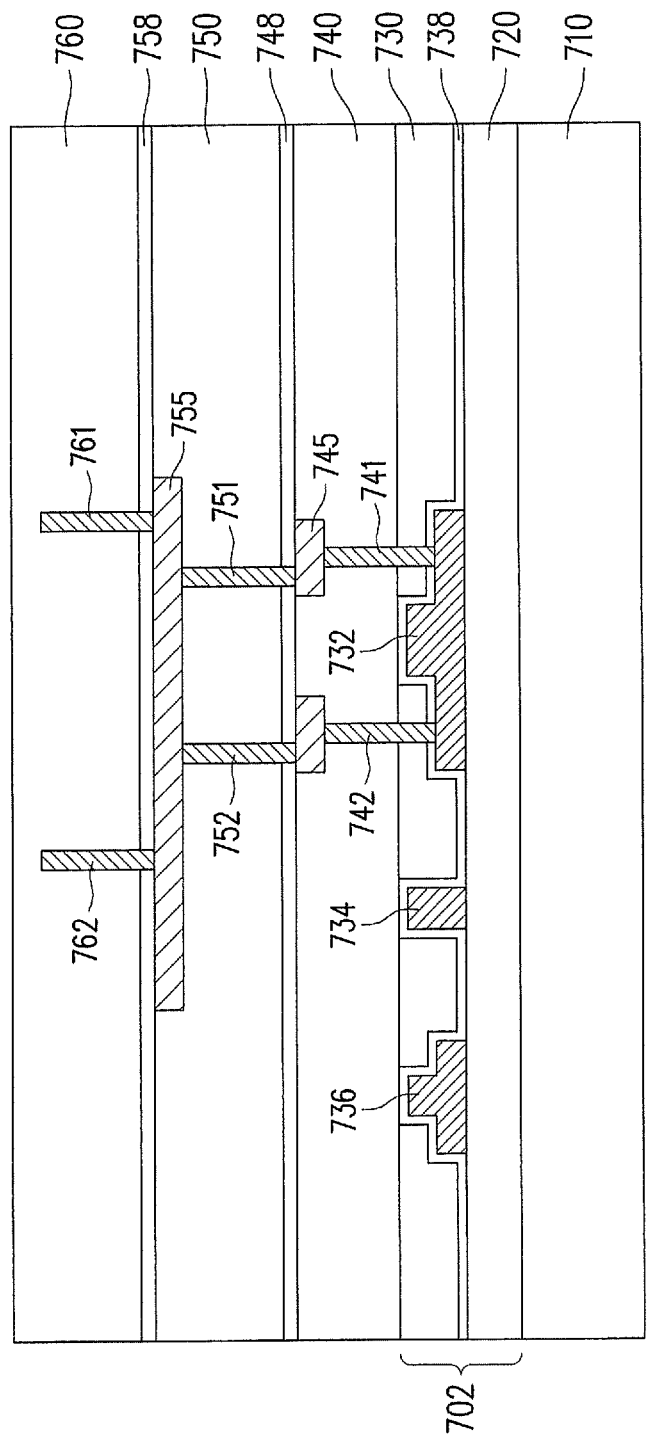
Figure 7N:
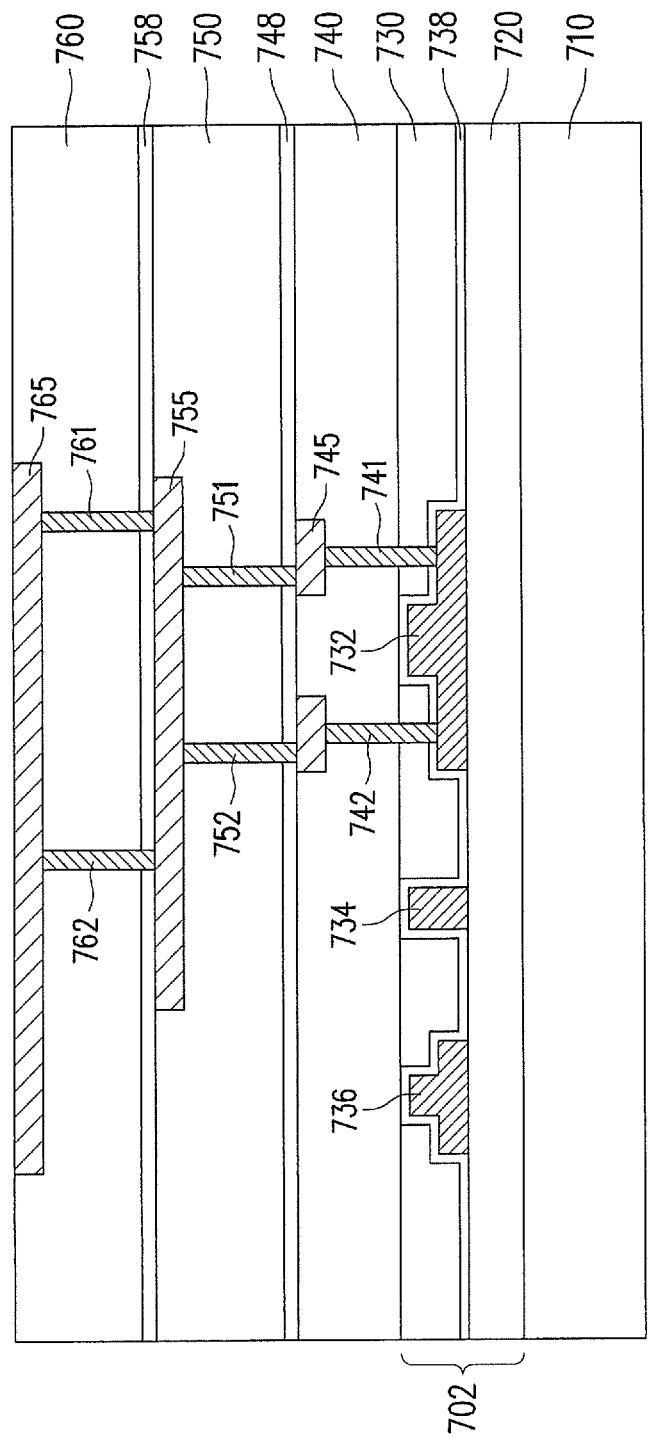
Figure 7O:
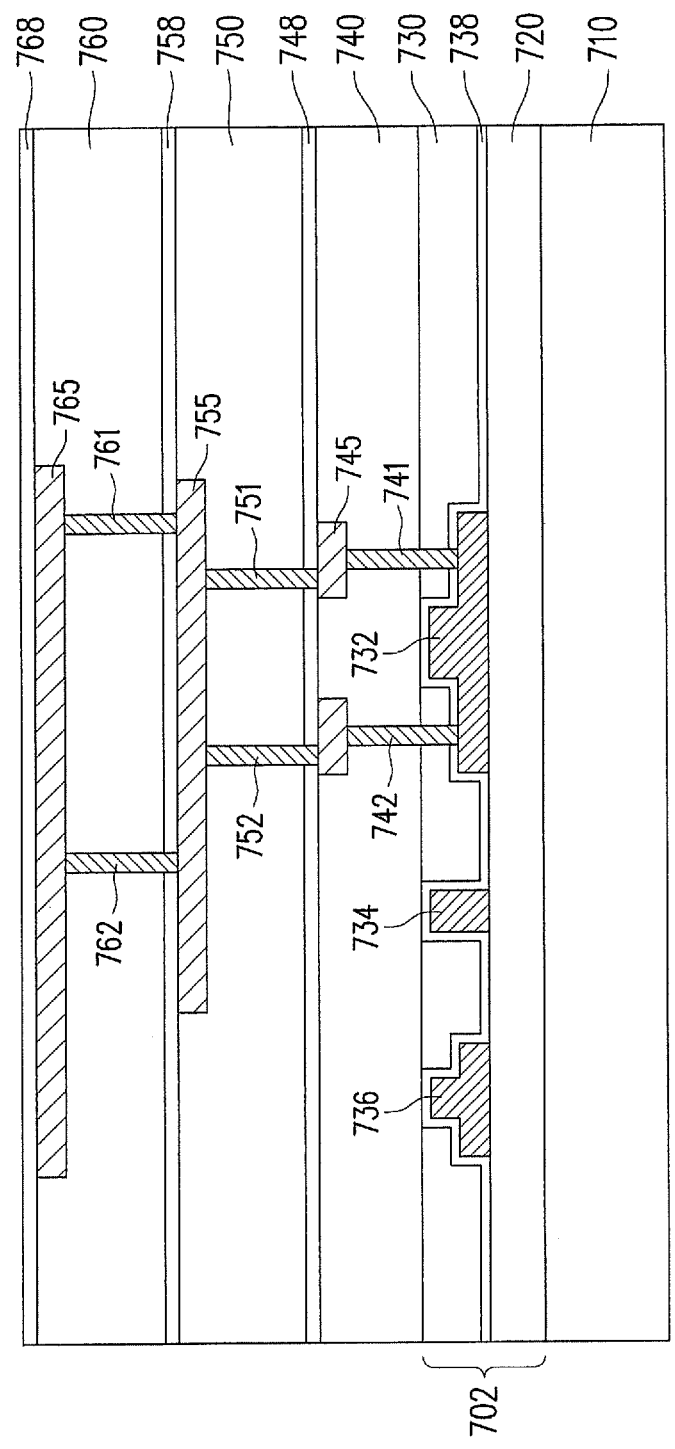
Figure 7P:
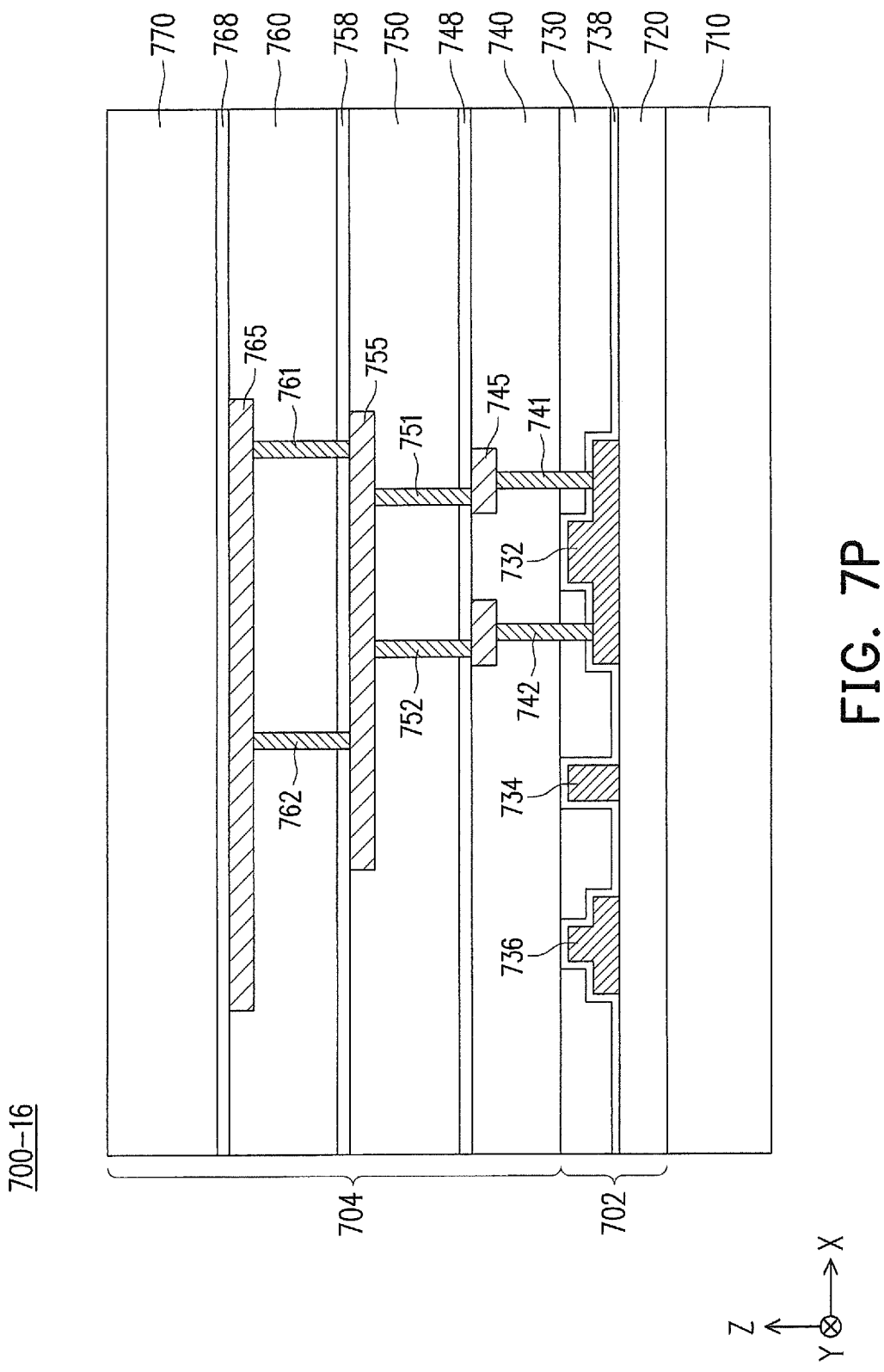

FIGS. 7A-7P illustrate cross-sectional views of an exemplary semiconductor device 700 including an edge coupler at various stages of a fabrication process, in accordance with some embodiments of the present disclosure. FIG. 7A is a cross-sectional view of the semiconductor device 700 including: a substrate 710; a dielectric layer 720 disposed on the substrate 710; and a plurality of coupling gratings 732, 734, 736 disposed on the dielectric layer 720, at one of the various stages of fabrication, according to some embodiments of the present disclosure. The substrate 710 may be formed of silicon, or another semiconductor material. The dielectric layer 720 may be formed of silicon oxide, or another oxide material. Each of the coupling gratings 732, 734, 736 may be formed of silicon, or another semiconductor material.

FIG. 7B is a cross-sectional view of the semiconductor device 700 including a coupling layer 738 formed on the coupling gratings 732, 734, 736 and the dielectric layer 720, at one of the various stages of fabrication, according to some embodiments of the present disclosure. In some embodiments, the coupling layer 738 may be formed by depositing a waveguide material, e.g. silicon or silicon nitride, on the coupling gratings 732, 734, 736 and the dielectric layer 720.

FIG. 7C is a cross-sectional view of the semiconductor device 700 including another dielectric layer 730 formed on the coupling layer 738, at one of the various stages of fabrication, according to some embodiments of the present disclosure. In some embodiments, the dielectric layer 730 may be formed by depositing a dielectric material, e.g. silicon oxide, or another oxide material, on the coupling layer 738. In some embodiments, the dielectric layer 720 and the dielectric layer 730 may be formed of a same material and be together referred to as one dielectric layer 702.

FIG. 7D is a cross-sectional view of the semiconductor device 700 including a cladding layer 740 formed on the dielectric layer 730, at one of the various stages of fabrication, according to some embodiments of the present disclosure. In some embodiments, the cladding layer 740 may be formed by depositing a dielectric material, e.g. silicon oxide or another oxide material, on the dielectric layer 730.

FIG. 7E is a cross-sectional view of the semiconductor device 700 including vias 741, 742 formed through the cladding layer 740, the dielectric layer 730, and the coupling layer 738, at one of the various stages of fabrication, according to some embodiments of the present disclosure. In some embodiments, the vias 741, 742 may be formed by etching the cladding layer 740, the dielectric layer 730, and the coupling layer 738; and depositing a metal material to form the metal vias 741, 742.

FIG. 7F is a cross-sectional view of the semiconductor device 700 including a metal 1 (M1) layer 745 formed on the vias 741, 742, at one of the various stages of fabrication, according to some embodiments of the present disclosure. In some embodiments, the M1 layer 745 may be formed by an etching process and a deposition process using a metal material. As such, the M1 layer 745 is electrically coupled to the waveguide 732, which may be a photonic device, by the metal vias 741, 742.

FIG. 7G is a cross-sectional view of the semiconductor device 700 including an inter-metal dielectric (IMD) layer 748 formed on the M1 layer 745 and the cladding layer 740, at one of the various stages of fabrication, according to some embodiments of the present disclosure. In some embodiments, the IMD layer 748 may be formed by depositing a dielectric material, e.g. silicon nitride, silicon carbon, silicon oxide, or a combination of any of the above, on the M1 layer 745 and the cladding layer 740.

FIG. 7H is a cross-sectional view of the semiconductor device 700 including a cladding layer 750 formed on the IMD layer 748, at one of the various stages of fabrication, according to some embodiments of the present disclosure. In some embodiments, the cladding layer 750 may be formed by depositing a dielectric material, e.g. silicon oxide or another oxide material, on the IMD layer 748.

FIG. 7I is a cross-sectional view of the semiconductor device 700 including vias 751, 752 formed through the cladding layer 750 and the IMD layer 748, at one of the various stages of fabrication, according to some embodiments of the present disclosure. In some embodiments, the vias 751, 752 may be formed by etching the cladding layer 750 and the IMD layer 748; and depositing a metal material to form the metal vias 751, 752.

FIG. 7J is a cross-sectional view of the semiconductor device 700 including a metal 2 (M2) layer 755 formed on the vias 751, 752, at one of the various stages of fabrication, according to some embodiments of the present disclosure. In some embodiments, the M2 layer 755 may be formed by an etching process and a deposition process using a metal material. As such, the M2 layer 755 is electrically coupled to the M1 layer 745 by the metal vias 751, 752.

FIG. 7K is a cross-sectional view of the semiconductor device 700 including an IMD layer 758 formed on the M2 layer 755 and the cladding layer 750, at one of the various stages of fabrication, according to some embodiments of the present disclosure. In some embodiments, the IMD layer 758 may be formed by depositing a dielectric material, e.g. silicon nitride, silicon carbon, silicon oxide, or a combination of any of the above, on the M2 layer 755 and the cladding layer 750.

FIG. 7L is a cross-sectional view of the semiconductor device 700 including a cladding layer 760 formed on the IMD layer 758, at one of the various stages of fabrication, according to some embodiments of the present disclosure. In some embodiments, the cladding layer 760 may be formed by depositing a dielectric material, e.g. silicon oxide or another oxide material, on the IMD layer 758.

FIG. 7M is a cross-sectional view of the semiconductor device 700 including vias 761, 762 formed through the cladding layer 760 and the IMD layer 758, at one of the various stages of fabrication, according to some embodiments of the present disclosure. In some embodiments, the vias 761, 762 may be formed by etching the cladding layer 760 and the IMD layer 758; and depositing a metal material to form the metal vias 761, 762.

FIG. 7N is a cross-sectional view of the semiconductor device 700 including a metal 3 (M3) layer 765 formed on the vias 761, 762, at one of the various stages of fabrication, according to some embodiments of the present disclosure. In some embodiments, the M3 layer 765 may be formed by an etching process and a deposition process using a metal material. As such, the M3 layer 765 is electrically coupled to the M2 layer 755 by the metal vias 761, 762.

FIG. 7O is a cross-sectional view of the semiconductor device 700 including an IMD layer 768 formed on the M3 layer 765 and the cladding layer 760, at one of the various stages of fabrication, according to some embodiments of the present disclosure. In some embodiments, the IMD layer 768 may be formed by depositing a dielectric material, e.g. silicon nitride, silicon carbon, silicon oxide, or a combination of any of the above, on the M3 layer 765 and the cladding layer 760.

FIG. 7P is a cross-sectional view of the semiconductor device 700 including a cladding layer 770 formed on the IMD layer 768, at one of the various stages of fabrication, according to some embodiments of the present disclosure. In some embodiments, the cladding layer 770 may be formed by depositing a dielectric material, e.g. silicon oxide or another oxide material, on the IMD layer 768. More metal layers may be formed on the cladding layer 770 and are omitted for simplicity here.

In some embodiments, the cladding layers 740, 750, 760, 770 may be formed of a same cladding material, e.g. silicon oxide, and be together referred to as one cladding layer 704. In some embodiments, the coupling layer 738 includes silicon, silicon nitride, or another material having a larger refractive index than the cladding material in the cladding layer 704. In some embodiments, each of the IMD layers 748, 758, 768 serves as a coupling layer, and includes a material including one or more of: silicon nitride, silicon carbon, silicon oxide, or another material having a larger refractive index than the cladding material in the cladding layer 704.

Figure 8:
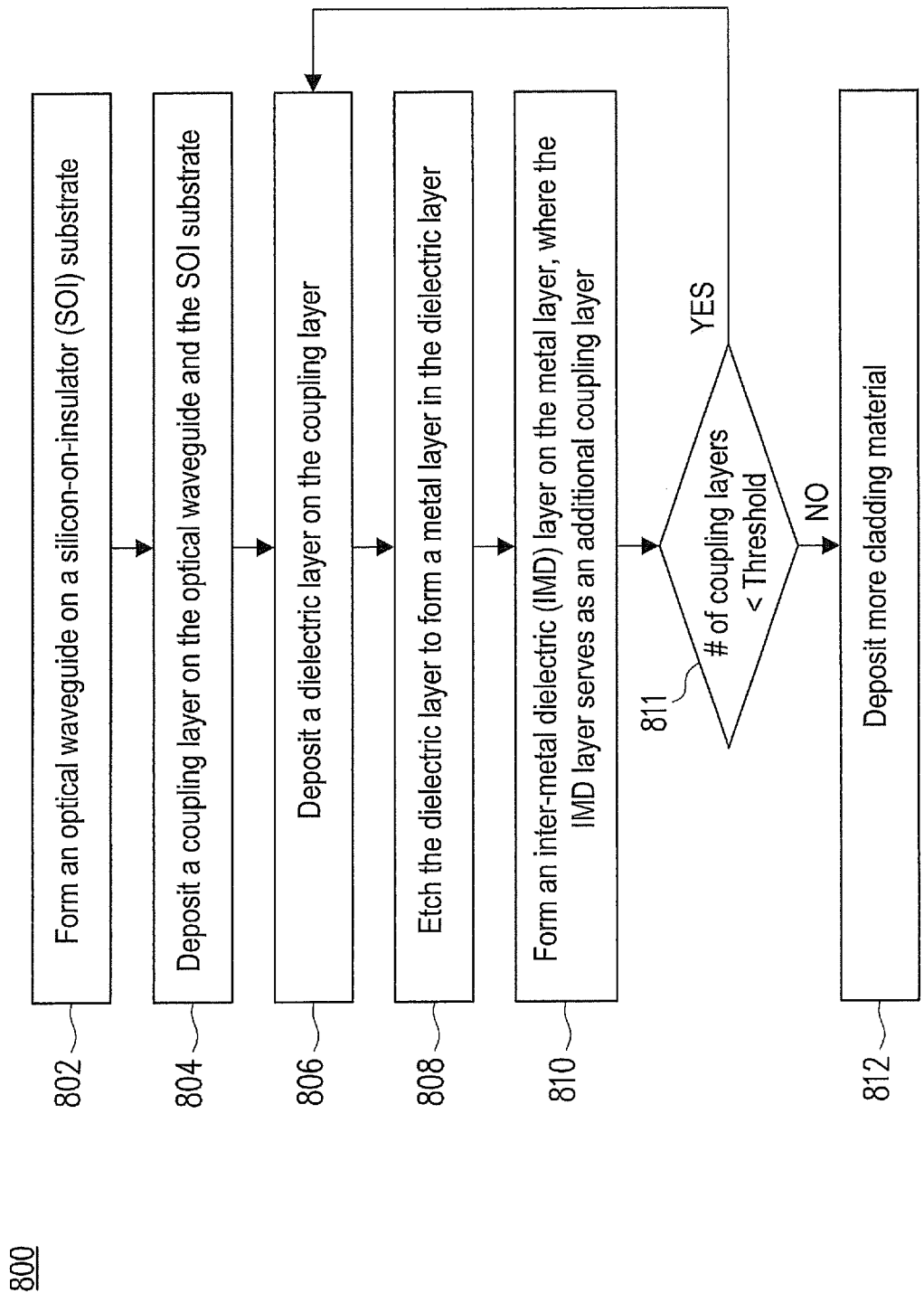
FIG. 8 shows a flow chart illustrating an exemplary method for forming a semiconductor device, in accordance with some embodiments of the present disclosure.

FIG. 8 shows a flow chart illustrating an exemplary method 800 for forming a semiconductor device, e.g. the semiconductor device as shown in any one of FIGS. 1-7, in accordance with some embodiments of the present disclosure. At operation 802, an optical waveguide is formed in a silicon-on-insulator (SOT) substrate. At operation 804, a coupling layer is deposited on the optical waveguide and the SOI substrate. At operation 806, a dielectric layer is deposited on the coupling layer. At operation 808, the dielectric layer is etched to form a metal layer in the dielectric layer. At operation 810, an inter-metal dielectric (IMD) layer is formed on the metal layer, where the IMD layer serves as an additional coupling layer. At operation 811, it is determined whether the number of coupling layers is less than a predetermined threshold. If so, the process goes back to operation 806 to deposit an additional dialectic layer. If not, the process goes to operation 812 to deposit more cladding material. The order of the operations shown in FIG. 8 may be changed according to different embodiments of the present disclosure.

In one embodiment, a semiconductor device for optical coupling is disclosed. The semiconductor device includes: a substrate; an optical waveguide over the substrate; and a plurality of layers over the optical waveguide. The plurality of layers includes a plurality of coupling pillars disposed at an edge of the semiconductor device. The plurality of coupling pillars form an edge coupler configured for optically coupling the optical waveguide to an optical fiber placed at the edge of the semiconductor device.

In another embodiment, a system for optical coupling is disclosed. The system includes: a semiconductor device and an optical fiber attached to an edge of the semiconductor device. The semiconductor device includes: a substrate, an optical waveguide over the substrate, and a plurality of layers over the optical waveguide. The plurality of layers includes a plurality of coupling pillars disposed at the edge of the semiconductor device. The plurality of coupling pillars optically couples the optical fiber to the optical waveguide.

In yet another embodiment, a method for forming a semiconductor device is disclosed. The method includes: (a) forming an optical waveguide on a silicon-on-insulator (SOI) substrate; (b) depositing a coupling layer on the optical waveguide and the SOI substrate; (c) depositing a dielectric layer on the coupling layer; (d) etching the dielectric layer to form a metal layer in the dielectric layer; (e) forming an inter-metal dielectric (IMD) layer on the metal layer, wherein the IMD layer serves as an additional coupling layer; and (f) repeating the above steps (c) to (e) for a predetermined number of times to generate a plurality of coupling layers. The plurality of coupling layers includes a plurality of coupling pillars disposed at an edge of the semiconductor device. The plurality of coupling pillars forms an edge coupler configured for optically coupling the optical waveguide to an optical fiber placed at the edge of the semiconductor device.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the broadest scope consistent with the novel features and principles disclosed herein.

What is claimed is:

1. A method for forming a semiconductor device, comprising:
   (a) forming an optical waveguide on a silicon-on-insulator (SOI) substrate;
   (b) depositing a coupling layer on the optical waveguide and the SOI substrate;
   (c) depositing a dielectric layer on the coupling layer;
   (d) etching the dielectric layer to form a metal layer in the dielectric layer;
   (e) forming an inter-metal dielectric (IMD) layer on the metal layer, wherein the IMD layer serves as an additional coupling layer; and
   (f) repeating the above steps (c) to (e) for a predetermined number of times to generate a plurality of coupling layers, wherein:
      the plurality of coupling layers include a plurality of coupling pillars disposed at an edge of the semiconductor device,
      the plurality of coupling pillars form an edge coupler configured for optically coupling the optical waveguide to an optical fiber placed at the edge of the semiconductor device,
      the optical waveguide comprises a plurality of gratings formed using silicon, and
      at least two of the plurality of gratings have different shapes from each other.

2. The method of claim 1, wherein:
   each dielectric layer deposited on a coupling layer comprises a dielectric material; and
   each of the plurality of coupling pillars comprises a material having a larger refractive index than the dielectric material.

3. The method of claim 2, wherein:
   the material in each coupling pillar comprises at least one of: silicon, silicon nitride, silicon carbon, or silicon oxide.

4. The method of claim 1, wherein:
   each of the plurality of coupling pillars extends along a lateral direction that is in parallel with a top surface of the SOI substrate.

5. The method of claim 4, wherein:
   at least one of the plurality of coupling pillars has a taper structure whose width gradually increases along the lateral direction from a first end inside the semiconductor device to a second end at the edge of the semiconductor device; and
   at least one of the plurality of coupling pillars has a non-taper structure whose width is kept constant along the lateral direction from the first end inside the semiconductor device to the second end at the edge of the semiconductor device.

6. The method of claim 4, wherein:
   each of the plurality of coupling pillars has a cross-section whose shape is one of: a polygon, a circle, or an oval; and
   the cross-section is on a surface perpendicular to the lateral direction.

7. The method of claim 4, wherein:
   the plurality of coupling pillars extend to the edge of the semiconductor device from a same surface perpendicular to the lateral direction;
   locations of the plurality of coupling pillars on the same surface form a shape; and
   the shape comprises at least one of: a circle, a half circle, a square, a rectangle, a triangle, or an oval.

8. The method of claim 5, wherein:
   the plurality of coupling pillars have different lengths measured from the same surface to the edge of the semiconductor device; and
   lengths of the plurality of coupling pillars gradually decrease as a distance between a respective coupling pillar and the substrate increases.

9. The method of claim 1, further comprising forming an oxide layer on the substrate, wherein:
   the optical waveguide is disposed within the oxide layer; and
   one of the plurality of coupling pillars is disposed within the oxide layer and has a taper structure whose width gradually increases along the lateral direction from a first end inside the semiconductor device to a second end at the edge of the semiconductor device.

10. The method of claim 9, wherein:
    the optical fiber has an inner diameter larger than twice a thickness of the oxide layer;
    the optical fiber has a larger mode size than the optical waveguide; and
    the edge coupler serves as a mode size converter configured for transmitting optical signals between the optical waveguide and the optical fiber.

11. A method for forming a semiconductor device, comprising:
    providing a substrate;
    forming an optical waveguide over the substrate; and
    forming a plurality of layers over the optical waveguide, wherein:
       the plurality of layers includes a plurality of coupling pillars disposed at an edge of the semiconductor device, and
       the plurality of coupling pillars form an edge coupler configured for optically coupling the optical waveguide to an optical fiber placed at the edge of the semiconductor device,
       the optical waveguide comprises a plurality of coupling gratings over the substrate,
       at least two of the plurality of coupling gratings have different shapes from each other,
       at least one of the plurality of coupling gratings comprises an active photonic device, and
       each of the plurality of coupling pillars extends along a lateral direction that is in parallel with a top surface of the substrate.

12. The method of claim 11, wherein:
    at least one of the plurality of coupling pillars has a taper structure whose width gradually increases along the lateral direction from a first end inside the semiconductor device to a second end at the edge of the semiconductor device; and
    at least one of the plurality of coupling pillars has a non-taper structure whose width is kept constant along the lateral direction from the first end inside the semiconductor device to the second end at the edge of the semiconductor device.

13. The method of claim 11, wherein:
each of the plurality of coupling pillars has a cross-section whose shape is one of: a polygon, a circle, or an oval; and
the cross-section is on a surface perpendicular to the lateral direction.

14. The method of claim 11, wherein:
the plurality of coupling pillars extend to the edge of the semiconductor device from a same surface perpendicular to the lateral direction;
locations of the plurality of coupling pillars on the same surface form a shape; and
the shape comprises at least one of: a circle, a half circle, a square, a rectangle, a triangle, or an oval.

15. The method of claim 14, wherein:
the plurality of coupling pillars have a same length measured from the same surface to the edge of the semiconductor device.

16. The method of claim 14, wherein:
the plurality of coupling pillars have different lengths measured from the same surface to the edge of the semiconductor device; and
lengths of the plurality of coupling pillars gradually decrease as a distance between a respective coupling pillar and the substrate increases.

17. A method of forming a semiconductor device for optical coupling, comprising:
providing a substrate;
forming an optical waveguide over the substrate, wherein:
the optical waveguide comprises a plurality of coupling gratings over the substrate,
at least two of the plurality of coupling gratings have different shapes from each other, and
at least one of the plurality of coupling gratings comprises an active photonic device; and
forming a plurality of layers over the optical waveguide, wherein:
the plurality of layers includes a plurality of coupling pillars disposed at an edge of the semiconductor device, wherein each of the plurality of coupling pillars extends along a lateral direction that is in parallel with a top surface of the substrate,
each of the plurality of coupling pillars has a cross-section whose shape is one of: a polygon, a circle, or an oval, and
the plurality of coupling pillars form an edge coupler configured for optically coupling the optical waveguide to an optical fiber placed at the edge of the semiconductor device.

18. The method of claim 17, wherein:
at least one of the plurality of coupling pillars has a taper structure whose width gradually increases along the lateral direction from a first end inside the semiconductor device to a second end at the edge of the semiconductor device; and
at least one of the plurality of coupling pillars has a non-taper structure whose width is kept constant along the lateral direction from the first end inside the semiconductor device to the second end at the edge of the semiconductor device.

19. The method of claim 18, wherein:
the plurality of coupling pillars extend to the edge of the semiconductor device from a same surface perpendicular to the lateral direction; and
the plurality of coupling pillars have different lengths measured from the same surface to the edge of the semiconductor device.

20. The method of claim 19, wherein the lengths of the plurality of coupling pillars gradually decrease as a distance between a respective coupling pillar and the substrate increases.

* * * * *